United States Patent
Matsumoto et al.

(10) Patent No.: US 10,044,199 B2
(45) Date of Patent: Aug. 7, 2018

(54) ELECTRIC STORAGE SYSTEM THAT DETECTS VOLTAGE VALUES OF A PLURALITY OF ELECTRIC STORAGE ELEMENTS

(71) Applicant: TOYOTA JIDOSHA KABUSHIKI KAISHA, Toyota-shi, Aichi-ken (JP)

(72) Inventors: Junichi Matsumoto, Toyota (JP); Takashi Ogura, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 123 days.

(21) Appl. No.: 15/029,274

(22) PCT Filed: Oct. 8, 2014

(86) PCT No.: PCT/IB2014/002052
§ 371 (c)(1),
(2) Date: Apr. 14, 2016

(87) PCT Pub. No.: WO2015/056068
PCT Pub. Date: Apr. 23, 2015

(65) Prior Publication Data
US 2016/0254683 A1 Sep. 1, 2016

(30) Foreign Application Priority Data
Oct. 16, 2013 (JP) .................... 2013-215889

(51) Int. Cl.
*H01M 10/44* (2006.01)
*H01M 10/46* (2006.01)
(Continued)

(52) U.S. Cl.
CPC ......... *H02J 7/0016* (2013.01); *B60L 11/1862* (2013.01); *B60L 11/1866* (2013.01);
(Continued)

(58) Field of Classification Search
CPC ...... H02J 7/1423; H02J 7/0013; H02J 7/0009; H02J 7/0019
(Continued)

(56) References Cited

U.S. PATENT DOCUMENTS

2013/0187611 A1\* 7/2013 Suzuki ............... B60L 11/1866
320/118
2015/0137763 A1 5/2015 Kikuchi
2015/0318721 A1 11/2015 Watanabe et al.

FOREIGN PATENT DOCUMENTS

CN 103119828 A 5/2013
EP 2618454 A1 7/2013
(Continued)

*Primary Examiner* — Edward Tso
(74) *Attorney, Agent, or Firm* — Sughrue Mion, PLLC

(57) ABSTRACT

An electric storage system includes plural electric storage elements, a voltage detection circuit, a discharging circuit, and a controller. The controller is configured to: (a) control an operation of the discharging circuit on the basis of the voltage values detected by the voltage detecting circuit, (b) determine a first reference voltage value indicating a lowest voltage value from the voltage values of the plurality of electric storage elements, (c) discharge the electric storage element indicating the voltage value of which a voltage difference from the first reference voltage value is greater than a first threshold value, and (d) set the first threshold value to a smaller value as the first reference voltage value becomes lower.

4 Claims, 12 Drawing Sheets

(51) Int. Cl.
   *H02J 7/00* (2006.01)
   *B60L 11/18* (2006.01)
(52) U.S. Cl.
   CPC .......... *H02J 7/0014* (2013.01); *H02J 7/0021* (2013.01); *H02J 7/0081* (2013.01); *B60L 2240/547* (2013.01); *B60L 2240/549* (2013.01); *Y02T 10/7005* (2013.01); *Y02T 10/7044* (2013.01); *Y02T 10/7055* (2013.01); *Y02T 10/7061* (2013.01)
(58) Field of Classification Search
   USPC .......................................... 320/116, 118, 119
   See application file for complete search history.

(56) References Cited

FOREIGN PATENT DOCUMENTS

| | | |
|---|---|---|
| JP | 2001-218376 A | 8/2001 |
| JP | 2014-036497 A | 2/2014 |
| WO | 2013/121721 A1 | 8/2013 |

\* cited by examiner

ELECTRIC STORAGE SYSTEM THAT DETECTS VOLTAGE VALUES OF A PLURALITY OF ELECTRIC STORAGE ELEMENTS

BACKGROUND OF THE INVENTION

1. Field of the Invention

The present invention relates to a technique of detecting voltage values of plural electric storage elements and discharging an electric storage element so as to suppress unevenness in the voltage values of the electric storage elements.

2. Description of Related Art

In Japanese Patent Application Publication No. 2001-218376 (JP 2001-218376 A), a battery pack is constructed by connecting plural battery cells in series. Here, voltage values of the battery cells are detected and a specific battery cell is discharged so as to align the voltage values of the battery cells. A discharging resistor and a discharging switch are connected in parallel to each battery cell and only a specific battery cell can be discharged by turning on a specific discharging switch.

SUMMARY OF THE INVENTION

Uneven degradation may occur in plural battery cells connected in series and unevenness may occur in full charging capacity of the battery cells depending on the uneven degradation. Here, FIG. 20 illustrates a voltage curve of a battery cell (initial cell) in an initial state and a voltage curve of a battery cell (degraded cell) in a degraded state. The initial state is a state where a battery cell does not degrade. The initial state includes, for example, a state of a new product just after a battery cell is manufactured.

In FIG. 20, the vertical axis represents the voltage value of a battery cell and the horizontal axis represents a charging quantity of a battery cell. The voltage curve is a curve indicating a relationship between the voltage value and the charging quantity. The solid line illustrated in FIG. 20 indicates the voltage curve of an initial cell and the one-dot chain line indicates the voltage curve of a degraded cell. When a battery cell degrades and the full charging capacity of the battery cell is lowered, the relationship is changed from the voltage curve indicated by the solid line to the voltage curve indicated by the one-dot chain line. Here, the voltage curve of the degraded cell is in a state where the voltage curve of the initial cell is reduced with respect to the charging quantity. In other words, the voltage curve of the initial cell is in a state where the voltage curve of the degraded cell is enlarged with respect to the charging quantity.

When a degraded cell and an initial cell are included in a battery pack, a difference in the voltage value between the degraded cell and the initial cell may be enlarged with charging and discharging of the battery pack even by aligning the voltage values of the battery cells. For example, when the voltage values of the degraded cell and the initial cell are aligned with a predetermined value $V\_tag$, the voltage curves of the degraded cell and the initial cell are illustrated in FIG. 21.

Here, the charging quantities of the degraded cell and the initial cell are maintained in the relationship illustrated in FIG. 20. Accordingly, in FIG. 21, the charging quantity (the horizontal axis in FIG. 21) defining the voltage curve of the degraded cell is different from the charging quantity (the horizontal axis in FIG. 21) defining the voltage curve of the initial cell. FIG. 21 illustrates a state where the charging quantities of the degraded cell and the initial cell are not made to correspond to each other and the voltage curves of the degraded cell and the initial cell intersect each other at a predetermined value $V\_tag$.

As can be seen from FIG. 21, in a range of the voltage value lower than the predetermined value $V\_tag$, as the voltage values of the degraded cell and the initial cell become closer to the predetermined value $V\_tag$, the voltage curves of the degraded cell and the initial cell are likely to be closer to each other. On the other hand, in the range of the voltage value lower than the predetermined value $V\_tag$, as the voltage values of the degraded cell and the initial cell become farther from the predetermined value $V\_tag$, the voltage curves of the degraded cell and the initial cell are likely to be farther away from each other.

When the battery pack is discharged after the voltage values of the degraded cell and the initial cell are aligned with the predetermined value $V\_tag$, the voltage value of the degraded cell is likely to be lower than the voltage value of the initial cell as illustrated in FIG. 21. Then, as the discharging of the battery pack progresses, a difference in voltage value (voltage difference $\Delta V$) between the degraded cell and the initial cell is enlarged. When the degraded cell is not discharged but only the initial cell is discharged in the state where the voltage difference $\Delta V$ is enlarged, the voltage values of the degraded cell and the initial cell can be aligned with each other again.

However, even when the voltage values are aligned with each other again, the voltage curves of the degraded cell and the initial cell are different from each other and thus the voltage difference $\Delta V$ between the degraded cell and the initial cell may be enlarged again with charging and discharging of the battery pack. In this way, when a difference in full charging capacity occurs between plural battery cells, discharging of the battery cells for aligning the voltage values is repeated.

According to an aspect of the invention, an electric storage system includes plural electric storage elements, a voltage detecting circuit, a discharging circuit, and a controller. The plural electric storage elements are connected in series. Each electric storage element is configured so that a slope of a voltage curve of the electric storage element at a lower-limit voltage value is greater than a slope of the voltage curve at another voltage value in a range of an upper-limit voltage value and the lower-limit voltage value in which charging and discharging of the electric storage element is allowed. The voltage curve is a curve indicating a relationship between a charging quantity and a voltage value in the electric storage element. The voltage detecting circuit is configured to detect the voltage values of the plurality of electric storage elements. The discharging circuit is configured to discharge the plurality of electric storage elements.

The controller is configured to: (a) control an operation of the discharging circuit on the basis of the voltage values detected by the voltage detecting circuit, (b) determine a first reference voltage value indicating a lowest voltage value from the voltage values of the plurality of electric storage elements, (c) discharge the electric storage element exhibiting the voltage value of which a voltage difference from the first reference voltage value is greater than a first threshold value, and (d) set the first threshold value to a smaller value as the first reference voltage value becomes lower.

By setting the first threshold value to be smaller, the electric storage element is discharged when the voltage difference decreases but the voltage difference is greater than the first threshold value. Accordingly, it is easier to align the voltage values of the plural electric storage elements as the first threshold value becomes smaller. In the invention, the lower the first reference voltage value becomes, the smaller the first threshold value becomes. Accordingly, the lower the voltage values of the electric storage elements becomes, the more the voltage values are likely to be aligned.

As illustrated in FIG. 20, the voltage curves of two electric storage elements having different full charging capacities are different from each other. Here, as described with reference to FIG. 20, the two different voltage curves have a relationship enlarged or reduced with respect to the charging quantity. Accordingly, even when the voltage curves are different from each other, the slope of the voltage curve at the lower-limit voltage value is maintained to be greater than the slopes of the voltage curve at different voltage values. As described above, when the voltage values are made to be easily aligned as the voltage values of the electric storage elements become lower, the two different voltage curves can be, brought close to each other so as to overlap with each other in a region of the voltage curves in which the slope is likely to increase. Specifically, it is possible to prevent the state illustrated in FIG. 21 from occurring, that is, to prevent the two different voltage curves from being spaced away from each other as the voltage value becomes lower.

The voltage curve of an electric storage element having a full charging capacity which has decreased has a shape obtained by reducing the voltage curve of an electric storage element having a full charging capacity which has not decreased with respect to the charging quantity. Accordingly, when two different voltage curves are brought close to each other in a region of the voltage curve in which the slope is likely to increase, it is possible to bring the two different voltage curves close to each other in the entire range (hereinafter, referred to as range of use) in which the electric storage element can be charged and discharged.

Since the two different voltage curves have a relationship which is enlarged or reduced with respect to the charging quantity, the two different voltage curves are likely to be close to each other in a region of the voltage curve in which the slope is likely to decrease. Accordingly, when the two different voltage curves are brought close to each other in a region of the voltage curve in which the slope is likely to increase, it is possible to bring the two different voltage curves close to each other in the entire range of use.

Accordingly, even when the voltage value varies with charging and discharging of an electric storage element, it is possible to suppress enlargement of the difference in voltage value (voltage difference) between two electric storage elements having different full charging capacities. That is, it is possible to continuously prevent the voltage difference from being enlarged in the range of use. As a result, it is possible to prevent the discharging of an electric storage element from being repeatedly performed so as to suppress the enlargement of the voltage difference.

When the first reference voltage value is the lower-limit voltage value, the first threshold value may be set to be small. Accordingly, it is possible to align the voltage values of plural electric storage elements with the lower-limit voltage value and it is thus easy to overlap the voltage curves of two electric storage elements having different full charging capacities with each other. When it is easy to overlap the voltage curves with each other, the voltage difference is less likely to occur.

When the first reference voltage value is the upper-limit voltage value, the first threshold value may be set to the largest value. When the first threshold value is set to be large, the voltage difference is unlikely to be greater than the first threshold value and the electric storage element is less likely to be discharged. When the voltage values of plural electric storage elements are aligned with the upper-limit voltage value, the voltage difference is enlarged with the discharging of the electric storage elements as described above. In the invention, it is difficult to align the voltage values of plural electric storage elements with the upper-limit voltage value and it is thus possible to suppress enlargement of the voltage difference with the discharging of the electric storage elements.

The plural electric storage element groups may be used and maybe connected in series. Here, when discharging determination is performed using the first threshold value, all the electric storage elements in at least two electric storage element groups may not be discharged. In this case, on the basis of the voltage values of the electric storage elements included in the electric storage element groups, it is possible to determine the electric storage element group including the electric storage elements indicating a second reference voltage value (lowest voltage value) and the other electric storage element groups. The other electric storage element group is an electric storage element group not including the electric storage element indicating the second reference voltage value.

When the voltage difference between the second reference voltage value and the voltage value of the electric storage element included in the other electric storage element group is greater than the second threshold value, the electric storage element included in the other electric storage element group may be discharged. Here, the higher the second reference voltage value becomes, the smaller the second threshold value may become. By setting the second threshold value to be smaller, the electric storage element is discharged when the voltage difference decreases but the voltage difference is greater than the second threshold value. Therefore, as the second threshold value becomes smaller, it is easier to align the voltage values of the electric storage elements in plural electric storage element groups.

The higher the second reference voltage value becomes, the smaller the second threshold value becomes. Accordingly, as the voltage values of the electric storage elements become higher, the voltage values of the electric storage elements are more easily aligned with each other. Accordingly, it becomes easy to secure an amount of energy (amount of power) at the time of discharging the electric storage elements. Here, when the voltage values are made to be easily aligned on the side in which the voltage values are high, it is easy to maintain the voltage values of the electric storage elements at high levels in the range of use, compared with the case where the voltage values are made to be easily aligned on the side in which the voltage values are low.

The higher the voltage value of an electric storage element becomes, the greater an amount of energy becomes. Accordingly, it is easy to secure the amount of energy by maintaining the voltage value at a high level in the range of use. That is, it is possible to suppress enlargement of the voltage difference in each electric storage element group as described above and to secure the amount of energy in plural electric storage element groups.

When the second reference voltage value is the upper-limit voltage value, the second threshold value may be set to the smallest value. Accordingly, it is easy to align the voltage values of the electric storage elements in the plural electric storage element groups with the upper-limit voltage value and it is easy to increase the amount of energy at the time of discharging the electric storage elements.

When the second reference voltage value is the lower-limit voltage value, the second threshold value may be set to the largest. When the second threshold value increases, the voltage difference is unlikely to be greater than the second threshold value and the electric storage element is less likely to be discharged. When the voltage values of the electric storage elements in plural electric storage element groups are aligned with the lower-limit voltage value, it is difficult to secure the amount of energy of the electric storage elements. In the invention, the voltage values of the electric storage elements are not easily aligned with the lower-limit voltage value and it is thus possible to prevent a state in which the amount of energy of the electric storage elements is not easily secured from occurring.

When discharging determination is performed using the first threshold value, all the electric storage elements in at least two electric storage element groups may not be discharged. In this case, the SOCs of the electric storage elements in each electric storage element group after the electric storage element groups are charged may be estimated. Here, the SOCs after being charged may be estimated from the full charging capacities and the current SOCs of the electric storage elements. When the difference between the minimum value of the estimated SOCs and a different estimated SOC is greater than a third threshold value, the electric storage element indicating the different SOC may be discharged.

By estimating the SOCs after being charged, it is possible to understand the SOC unevenness after being charged. When the SOC difference is greater than the third threshold value and the SOC unevenness occurs, the electric storage element can be discharged in advance. Accordingly, when plural electric storage element groups are actually charged, the SOCs of the electric storage elements can be aligned with each other. In other words, the voltage values of the electric storage elements can be aligned on the side in which the voltage values are high. Accordingly, similarly to the above-mentioned case, it is easy to secure the amount of energy of the electric storage elements.

A zener diode may be connected to each electric storage element via a line connecting the electric storage element and the voltage detecting circuit. Here, the cathode of the zener diode may be connected to the positive electrode terminal of the electric storage element and the anode of the zener diode may be connected to the negative electrode terminal of the electric storage element. By using the zener diode, it is possible to prevent an excessive voltage from being applied to the voltage detecting circuit from the electric storage element.

By setting the voltage values of plural electric storage elements' included in an electric storage element group to a predetermined range by discharging of the electric storage elements using the first threshold value, it is possible to determine the breakdown of the zener diode. The breakdown of a zener diode means that a leakage current flows in the zener diode. When a leakage current flows in the zener diode corresponding to one of the electric storage elements, the voltage value of the one is lower than the lower limit value of the predetermined range and the voltage value of an electric storage element connected in series to the one becomes higher than the upper limit value of the predetermined range. By understanding the behavior of the voltage value, it is possible to determine the breakdown of the zener diode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
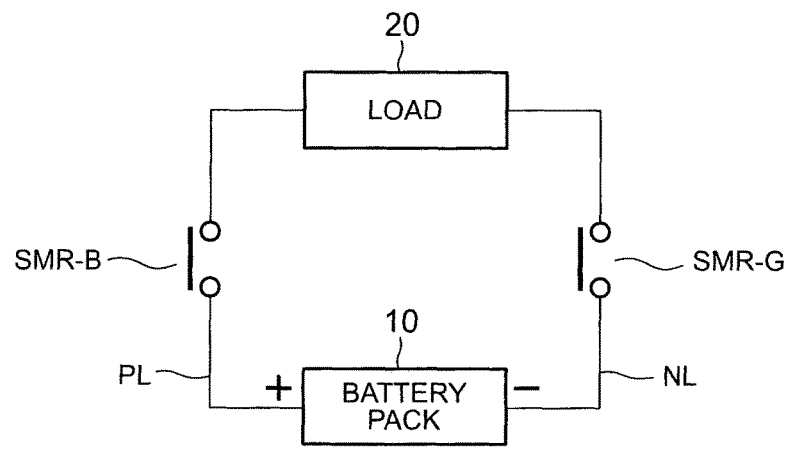
FIG. 1 is a diagram illustrating a configuration of a battery system.

FIG. 1 is a diagram illustrating a configuration of a battery system (corresponding to the electric storage system in the claims) according to this embodiment. A battery pack 10 is connected to a load 20, via a positive electrode line PL and a negative electrode line NL. Here, the positive electrode line PL is connected to the positive electrode terminal of the battery pack 10 and the negative electrode line NL is connected to a negative electrode terminal of the battery pack 10.

The positive electrode line PL is provided with a system main relay SMR-B and the negative electrode line NL is provided with a system main relay SMR-G. When the system main relays SMR-B, SMR-G are turned on, the battery pack 10 is connected to a load 20. When the system main relays SMR-B, SMR-G are turned off, the battery pack 10 and the load 20 are disconnected from each other.

The battery system illustrated in FIG. 1 can be mounted, for example, in a vehicle. In this case, a motor-generator set can be used as the load 20. The motor-generator set is supplied with power output from the battery pack 10 and generates kinetic energy for causing the vehicle to run. The motor-generator set can convert the kinetic energy generated at the time of braking the vehicle into power and can output the power to the battery pack 10.

The configuration of the battery pack 10 will be described below with reference to FIG. 2. The battery pack 10 includes three battery groups (corresponding to the electric storage element groups in the claims 11 (11A, 11B, and 11C) connected in series. In this embodiment, the number of battery groups 11 constituting the battery pack 10 can be two or more. Each battery group 11 may be constituted as a single unit. In this case, each battery group 11 can be individually interchanged.

Each of the battery groups 11A to 11C includes plural battery cells (corresponding to electric storage elements in the claims) 12 connected in series. The number of battery cells 12 constituting each battery group 11 can be appropriately set. The battery group 11 may include plural battery cells 12 connected in parallel. A secondary battery such as a nickel-hydrogen battery or a lithium-ion battery can be used as the battery cell 12. An electric double-layer capacitor may be used instead of the secondary battery.

The positive electrode terminal and the negative electrode terminal of each battery cell 12 are connected to a monitoring unit 30 (30A, 30B, 30C) via a detection line DL. The monitoring unit 30 is used to detect the voltage value Vb of each battery cell 12 and the output signal of the monitoring unit 30 is input to a controller 40. The monitoring unit 30A detects the voltage values Vb of the battery cells 12 included in the battery group 11A. The monitoring unit 30B detects the voltage values Vb of the battery cells 12 included in the battery group 11B. The monitoring unit 30C detects the voltage values Vb of the battery cells 12 included in the battery group 11C.

The controller 40 includes a memory 41, and the memory 41 stores a variety of information. The memory 41 may be disposed outside the controller 40. Here, the controller 40 can output a control signal for switching the system main relays SMR-B, SMR-G illustrated in FIG. 1 between an ON state and an OFF state. A timer 42 measures time t1 and outputs the measurement result to the controller 40. A timer 43 measures time t2 and outputs the measurement result to the controller 40. Details of times t1, t2 will be described later.

Figure 3:
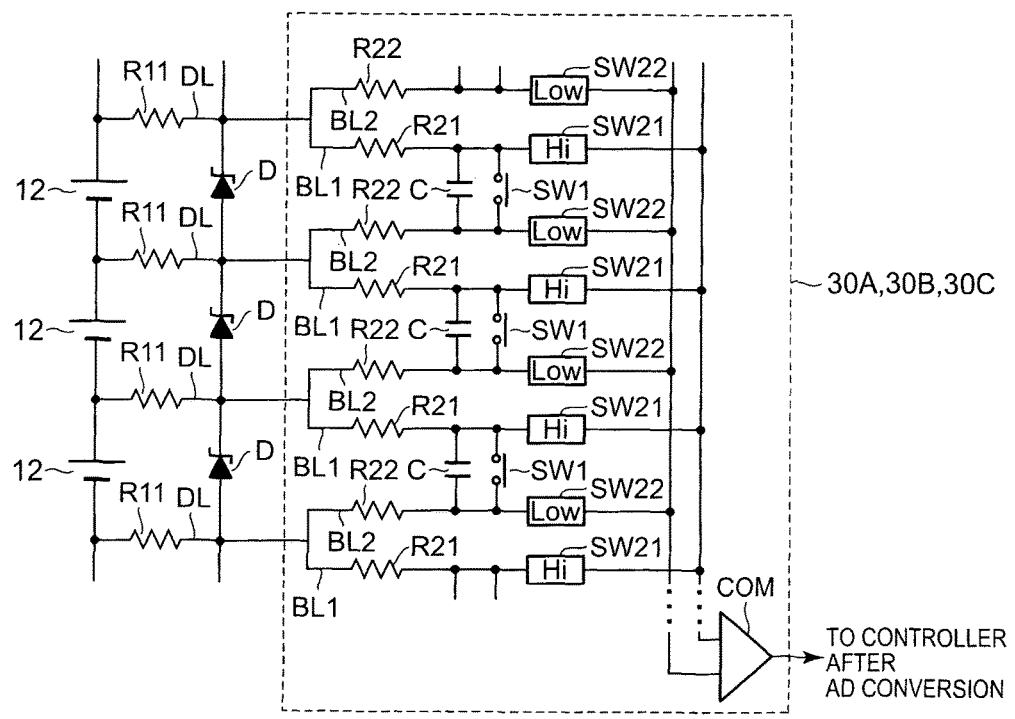
FIG. 3 is a diagram illustrating a circuit configuration of a part of the monitoring unit.

A circuit configuration of the monitoring unit 30 (30A to 30C) will be described below with reference to FIG. 3. FIG. 3 illustrates a circuit configuration of a part of the monitoring unit 30.

Each detection line DL is provided with a resistive element R11. When a current larger than an allowable current value flows in the resistive element R11, the resistive element R11 fuses and it is thus possible to disconnect the monitoring unit 30 and the battery pack 10. Accordingly, it is possible to prevent an excessive current from flowing into the monitoring unit 30 from the battery pack 10.

A zener diode D is connected in parallel to each battery cell 12 via two detection lines DL. Here, the cathode of the zener diode D is connected to the positive electrode terminal of the battery cell 12 and the anode of the zener diode D is connected to the negative electrode terminal of the battery cell 12. The zener diode D is used to prevent an excessive voltage from being applied to the monitoring unit 30 from the battery pack 10. That is, when an excessive voltage is applied to the monitoring unit 30 from the battery pack 10, a current flows from the cathode of the zener diode D to the anode thereof, thereby preventing an excessive voltage from being applied to the monitoring unit 30. Here, plural zener diodes D are connected in series to each other.

A detection line DL is branched into two branches and the branched lines BL1, BL2 are provided with resistive elements R21, R22, respectively. Here, the zener diode D is connected to a connection point between the resistive elements R21, R22 and the resistive element R11. In two detection lines DL connected to battery cell 12, a capacitor (flying capacitor) C and a switch SW1 are connected between the branched line BL1 of one detection line DL and the branched line BL2 of the other detection line DL.

Specifically, the capacitor C and the switch SW1 are connected between the branched line BL1 between the resistive element R21 and the sampling switch SW21 and the branched line BL2 between the resistive element R22 and the sampling switch SW22. The sampling switches SW21, SW22 are switched between an ON state and an OFF state in response to a control signal from the controller 40.

The switch SW1 is switched between an ON state and an OFF state in response to a control signal from the controller 40. Each switch SW1 is connected in parallel to the corresponding battery cell 12 via the detection line DL. When the switch SW1 is turned on, a closed circuit is constituted by the switch SW1, the battery cell 12, and the detection line DL, thereby discharging the battery cell 12. By causing a discharging current of the battery cell 12 to flow in the resistive elements R11, R21, and R22, it is possible to lower the voltage value Vb of the battery cell 12.

Since each capacitor C is connected in parallel to the corresponding battery cell 12 via the detection line DL, the capacitor C is charged with the electric charge accumulated in the battery cell 12. Accordingly, the voltage value Vc of the capacitor C is equal to the voltage value Vb of the battery cell 12.

The voltage value Vb of a specific battery cell 12 (herein, the voltage value Vc of the capacitor C) can be detected by turning on the sampling switches SW21, SW22 corresponding to the specific battery cell 12. Here, the sampling switch SW21 is connected to one input terminal of a comparator COM and the sampling switch SW22 is connected to the other input terminal of the comparator COM. The output signal of the comparator COM is AD-converted and then input to the controller 40. Accordingly, the controller 40 can detect the voltage value Vb (voltage value Vc) of the battery cell 12.

The controller 40 can sequentially detect the voltage values Vb (voltage values Vc) of the battery cells 12 by sequentially turning on the sampling switches SW21, SW22 corresponding to the battery cells 12. The sampling switches SW21, SW22 can be constituted by multiplexers.

Unevenness in the voltage values Vb (voltage value Vc) of the plural battery cells 12 can be suppressed by turning on the switches SW1 to discharge the battery cells 12 as described above. Here, the process of suppressing the unevenness in the voltage values Vb is referred to as an equalization process.

As described above, the monitoring unit 30 according to this embodiment has a function (voltage detecting circuit) of detecting the voltage values Vb of the battery cells 12 and a function (discharging circuit) of discharging the battery cells 12. Here, the voltage detecting circuit and the discharging circuit may be separately constituted. Specifically, the voltage detecting circuit is connected to the respective battery cells 12, and the discharging circuit is connected to the respective battery cells 12 using a connection line other than the connection line between the voltage detecting circuit and the corresponding battery cell 12.

Figure 4:
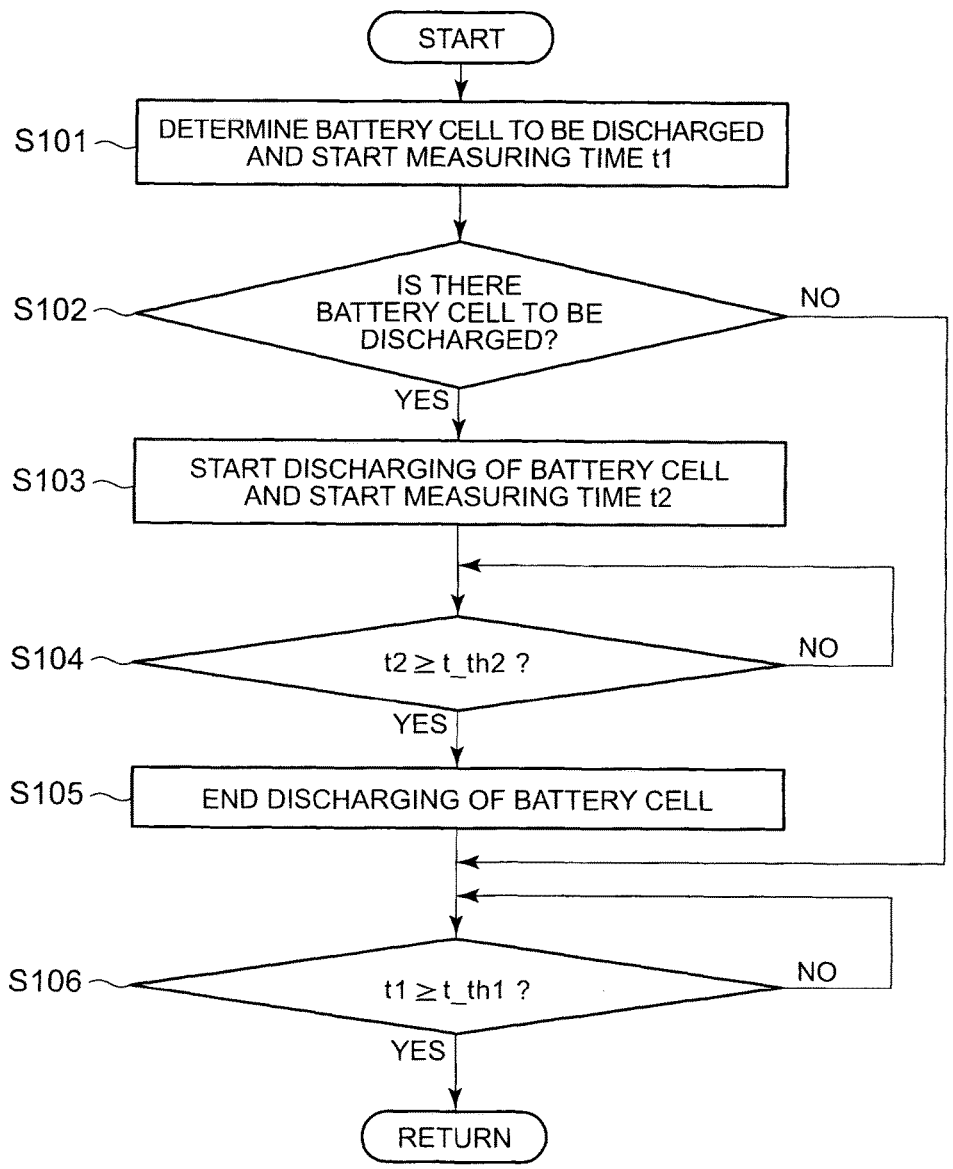
FIG. 4 is a flowchart illustrating an equalization process.

The equalization process will be described below with reference to the flowchart illustrated in FIG. 4. The process illustrated in FIG. 4 is performed by the controller 40, and the process illustrated in FIG. 4 can be performed, for example, while the battery pack 10 is not connected to the load 20. The controller 40 can operate with a supply of power from a power supply other than the battery pack 10.

In step S101, the controller 40 specifies a battery cell 12 to be discharged in the equalization process and starts measurement of time t1 using the timer 42. Here, at the time of performing the process of step S101, a battery cell 12 to be discharged may not be present. In this case, the battery cell 12, to be discharged is not specified. Details of the process of determining the battery cell 12 to be discharged will be described later.

In step S102, the controller 40 determines whether a battery cell 12 to be discharged is present on the basis of the process result of step S101. Here, the controller 40 performs the process of step S103 when a battery cell 12 to be discharged is specified, and the controller 40 performs the process of step S106 when, a battery cell 12 to be discharged is not specified.

In step S103, the controller 40 starts discharging of the battery cell 12 specified in the process of step S101. Specifically, the controller 40 discharges the battery cell 12 by switching the switch SW1 (see FIG. 3) corresponding to the specified battery cell 12 from the OFF state to the ON state. The switches SW1 corresponding to the battery cells 12 not to be discharge are maintained in the OFF state. When the discharging of the battery cell 12 is started, the controller 40 starts measuring of time t2 using the timer 43. The measured time t2 represents the time in which the battery cell 12 is continuously discharged by turning on the switch SW1.

In step S104, the controller 40 determines whether the measured time t2 is equal to or greater than a predetermined time t_th2. The predetermined time t_th2 can be appropriately set and information for determining the predetermined time t_th2 can be stored in the memory 41. The controller 40 waits until the measured time t2 becomes equal to or greater than the predetermined time t_th2 after starting the discharging of the battery cell 12. That is, the battery cell 12 is continuously discharged during the predetermined time t_th2.

When the measured time t2 is equal to or greater than the predetermined time t_th2, the controller 40 ends the discharging of the battery cell 12 in step S105. Specifically, the controller 40 switches the turned-on the switch SW1 to the OFF state through the process of step S103. Here, at the time of ending the discharging of the battery cell 12, the controller 40 resets the measured time t2.

In step S106, the controller 40 determines whether time t1 at which the measurement is started by the process of step S101 is equal to or greater than, a predetermined time t_th1.

The predetermined time t_th1 is a time for determining a period in which the process illustrated in FIG. 4 is performed and is a time which is equal to or greater than the predetermined time t_th2. The information for determining the predetermined time t_th1 can be stored in the memory 41.

The controller 40 waits until the measured time t1 becomes equal to or greater than the predetermined time t_th1, and the controller 40 resets the measured time t1 and then performs the process of step S101 again when the measured time t1 is equal to or greater than the predetermined time t_th1.

Figure 5:
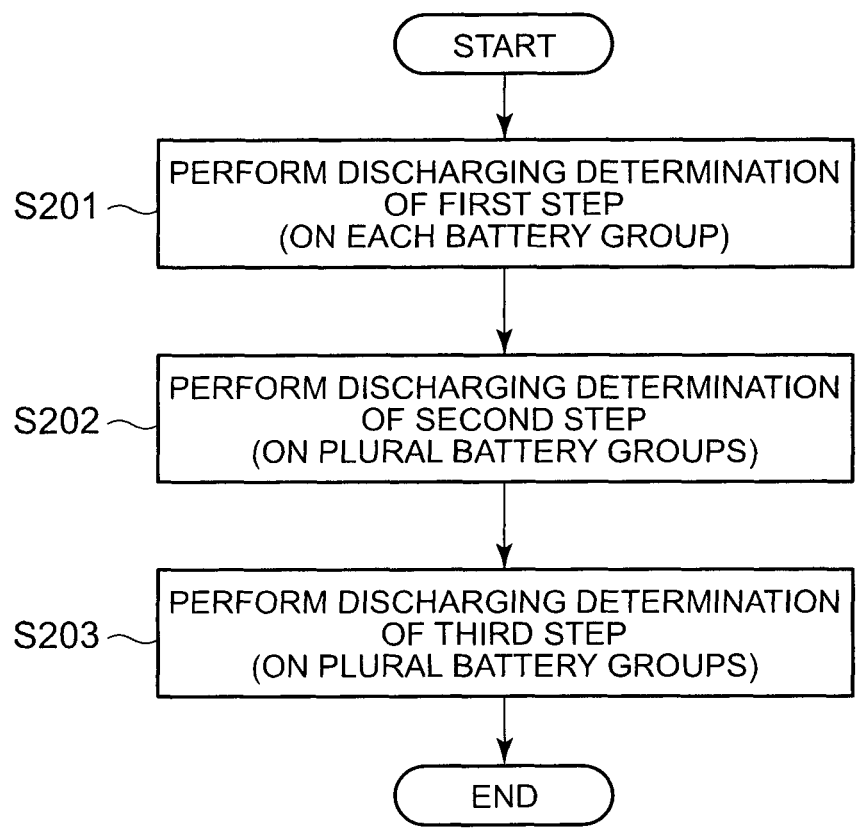
FIG. 5 is a flowchart illustrating a discharging determination process.

Details of the process of step S101 illustrated in FIG. 4, that is, the process of determining a battery cell 12 to be discharged, will be described below with reference to the flowchart illustrated in FIG. 5. The process illustrated in FIG. 5 is performed by the controller 40.

In step S201, the controller 40 specifies a battery cell 12 to be discharged in the respective battery groups 11A to 11C as discharging determination of a first step. Specifically, as will be described later, the voltage values Vb of all the battery cells 12 included in the battery group 11 are compared with each other and a battery cell 12 to be discharged is specified. In the discharging determination of the first step, a battery cell 12 to be discharged is specified so as to align the voltage values Vb of all the battery cells 12 included in the battery group 11.

In step S202, the controller 40 specifies a battery cell 12 to be discharged in the battery groups 11A to 11C as discharging determination of a second step. The battery cell 12 to be discharged is all the battery cells 12 included in the battery group 11.

Here, the discharging determination of the second step is performed on the battery group 11 not including the battery cell 12 to be discharged specified through the discharging determination of the first step. Specifically, as will be described later, the voltage values Vb of all the battery cells 12 in the plural battery groups 11 to be subjected to the discharging determination are compared with each other and a battery cell 12 to be discharged is specified. In the discharging determination of the second step, the battery cell 12 to be discharged is specified-so as to align the voltage values Vb of the battery cells 12 and to secure an amount of energy (an amount of power) when the battery pack 10 is discharged.

In step S203, the controller 40 specifies a battery cell 12 to be discharged in the battery groups 11A to 11C as discharging determination of a third step. The battery cell 12 to be discharged is all the battery cells 12 included in the battery group 11.

Here, the discharging determination of the third step is performed on the battery group 11 not including the battery cell 12 to be discharged specified through the discharging determination of the first step. In the discharging determination of the third step, the battery cell 12 to be discharged is specified so as to align the voltage values Vb of the battery cells 12 when the battery pack 10 is charged and to secure an amount of energy (an amount of power) when the battery pack 10 is discharged.

Figure 6:
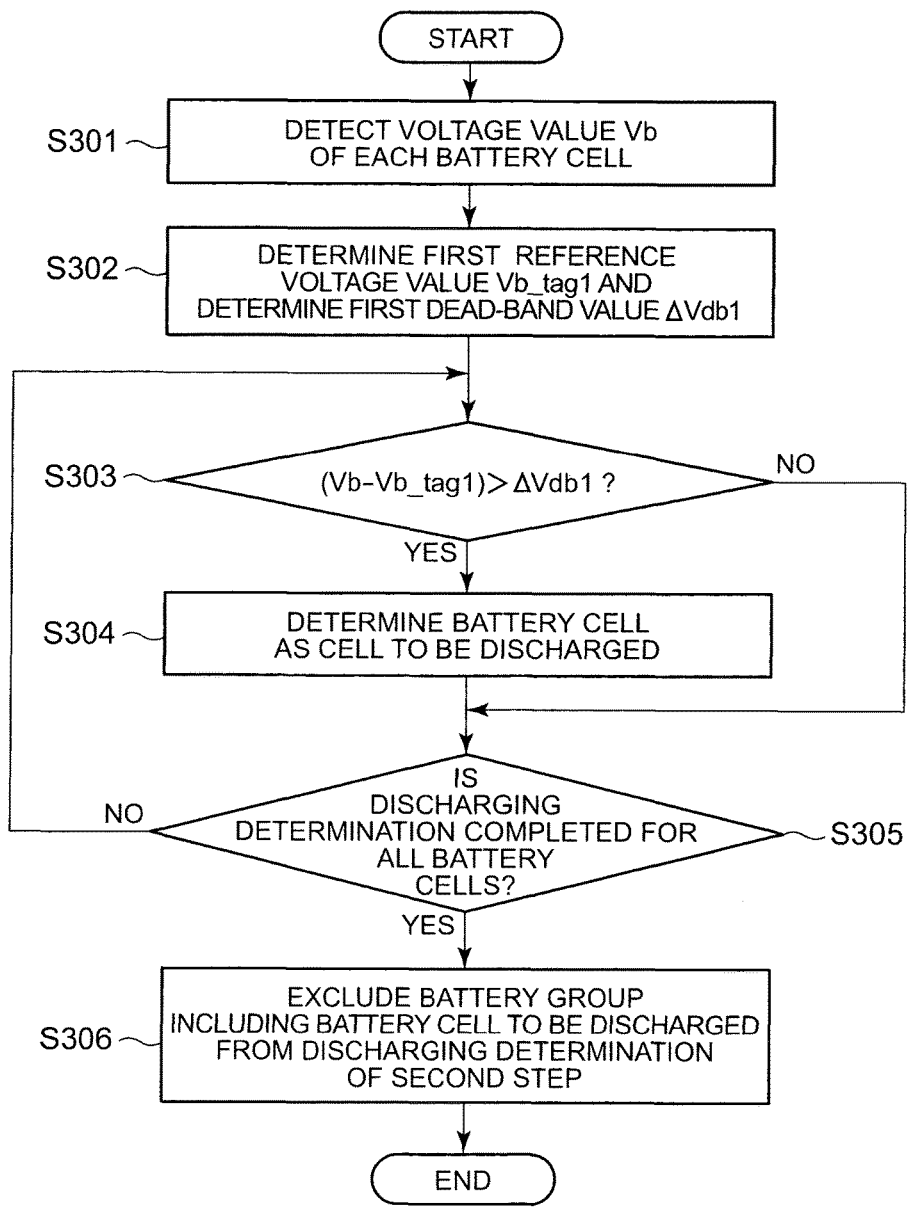
FIG. 6 is a flowchart illustrating a discharging determination process of a first step.

Details of the process of step S201 (the discharging determination of the first step) illustrated in FIG. 5 will be described below with reference to the flowchart illustrated in FIG. 6. The process illustrated in FIG. 6 is performed on each battery group 11 by the controller 40.

In step S301, the controller 40 detects the voltage values Vb of all the battery cells 12 included in the respective battery groups 11A to 11C on the basis of the output signals of the monitoring units 30A to 30C. Here, it is preferable that an open circuit voltage (OCV) be, used as the voltage value Vb. Accordingly, it is possible to understand the unevenness in the voltage values Vb of the battery cells 12 while ignoring polarized components or the like generated by charging and discharging of the battery cells 12.

In step S302, the controller 40 specifies a first reference voltage value Vb_tag1 and a first dead-band value (corresponding to the first threshold value in the claims) ΔVdb1. The first reference voltage value Vb_tag1 is the lowest voltage value Vb out of the voltage values Vb of all the battery cells 12 included in the battery group 11. Since the process illustrated in FIG. 6 is performed for each battery group 11, the first reference voltage value Vb_tag1 is specified for each battery group 11. The first reference voltage value Vb_tag1 can be specified on the basis of the detection result of step S301.

The first dead-band value ΔVdb1 is a value (positive value) for determining whether to discharge a battery cell 12 in the discharging determination of the first step. A battery cell 12 indicating a voltage value Vb higher than the first reference voltage value Vb_tag1 can be discharged. Here, the determination of whether to discharge a battery cell 12 is performed on the basis of the first dead-band value ΔVdb1. Specifically, when the voltage difference ΔV between the voltage value Vb of a battery cell 12 and the first reference voltage value Vb_tag1 is equal to or less than the first dead-band value ΔVdb1, it is determined that the battery cell 12 is not discharged. On the other hand, when the voltage difference ΔV is greater than the first dead-band value ΔVdb1, it is determined that the battery cell 12 is discharged.

Figure 7:
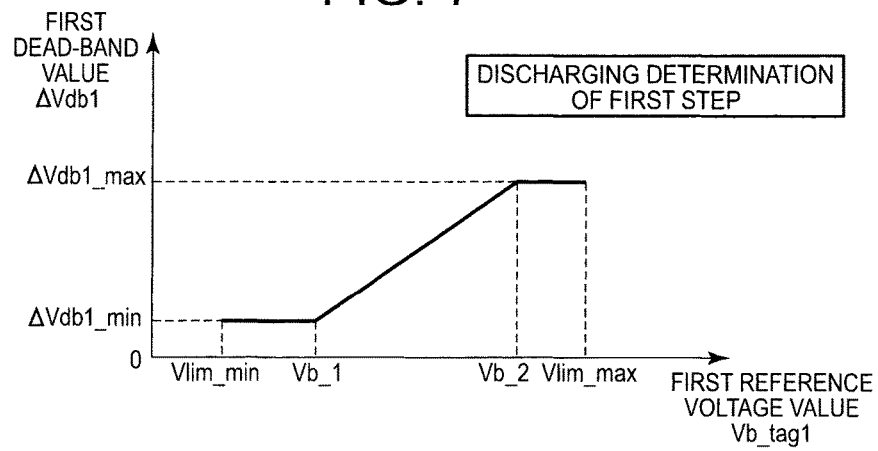
FIG. 7 is a diagram illustrating a relationship between a first dead-band value and a first reference voltage value.

The first reference voltage value Vb_tag1 and the first dead-band value ΔVdb1 have a relationship (an example) illustrated in FIG. 7. The relationship illustrated in FIG. 7 is specified in advance and information (a map or an operational expression) indicating the relationship is stored in the memory 41. As illustrated in FIG. 7, the first dead-band value ΔVdb1 varies with the variation of the first reference voltage value Vb_tag1. When the relationship illustrated in FIG. 7 is used, it is possible to determine the first dead-band value ΔVdb1 corresponding to the first reference voltage value Vb_tag1 by determining the first reference voltage value Vb_tag1.

In FIG. 7, when the first reference voltage value Vb_tag1 is a lower-limit voltage value Vlim_min, the first dead-band value ΔVdb1 is set to a minimum value ΔVdb1_min. The lower-limit voltage value Vlim_min is a voltage value of a lower limit at which the voltage drop is allowed when the battery cell 12 is discharged. The lower-limit voltage value Vlim_min is set in advance on the basis of charging and discharging characteristics of the battery cell 12 or the like.

In the discharging control of a battery cell 12, the battery cell 12 is discharged so that the voltage value Vb of the battery cell 12 is not less than the lower-limit voltage value Vlim_min. Accordingly, in a range in which the first reference voltage value Vb_tag1 is less than the lower-limit voltage value Vlim_min, the first dead-band value ΔVdb1 is not set. In a range in which the first reference voltage value Vb_tag1 is less than the lower-limit voltage value Vlim_min, the processes of steps subsequent to step S303 to be described later may not be performed.

The minimum value ΔVdb1_min is a value which is appropriately set from the viewpoint of most suppressing the unevenness in the voltage values Vb. For example, the minimum value ΔVdb1_min can be set to 0. The minimum value ΔVdb1_min may be set to a value greater than 0 in consideration of an error or the like when the monitoring unit 30 detects the voltage values Vb of the battery cells 12.

In the example illustrated in FIG. 7, when the first reference voltage value Vb_tag1 is present between the lower-limit voltage value Vlim_min and a first predetermined value Vb_1, the first dead-band value ΔVdb1 is set to the minimum value ΔVdb1_min. The first predetermined value Vb_1 is a voltage value greater than the lower-limit voltage value Vlim_min and can be appropriately set. As the first reference voltage value Vb_tag1 becomes greater than the first predetermined value Vb_1, the first dead-band value ΔVdb1 becomes greater than the minimum value ΔVdb1_min. When the first reference voltage value Vb_tag1 is greater than the lower-limit voltage value Vlim_min, the first dead-band value ΔVdb1 may be set to be greater than the minimum value ΔVdb1_min.

When the first reference voltage value Vb_tag1 reaches a second predetermined value Vb_2, the first dead-band value ΔVdb1 is set to a maximum value ΔVdb1_max. The second predetermined value Vb_2 is a voltage value greater than the first predetermined value Vb_1 and can be appropriately set. The maximum value ΔVdb1_max is a value which is appropriately set from the viewpoint of maintaining the unevenness in the voltage values Vb. In this embodiment, the battery cell 12 is not discharged regardless of the voltage difference ΔV between the voltage value Vb of the battery cell 12 and the first reference voltage value Vb_tag1 by setting the maximum value ΔVdb1_max.

When the first reference voltage value Vb_tag1 is present between the second predetermined value Vb_2 and an upper-limit voltage value Vlim_max, the first dead-band value ΔVdb1 is set to the maximum value ΔVdb1_max. The second predetermined value Vb_2 is a voltage value less than the upper-limit voltage value Vlim_max. The upper-limit voltage value Vlim_max is a voltage value of an upper limit at which the voltage rise is allowed at the time of charging the battery cell 12. The upper-limit voltage value Vlim_max is set in advance on the basis of charging and discharging characteristics of the battery cell 12.

In the charging control of the battery cell 12, the battery cell 12 is charged so that the voltage value Vb of the battery cell 12 is not greater than the upper-limit voltage value Vlim_max. Accordingly, in a range in which the first reference voltage value Vb_tag1 is greater than the upper-limit voltage value Vlim_max, the first dead-band value ΔVdb1 is not set. In a range in which the first reference voltage value Vb_tag1 is greater than the upper-limit voltage value Vlim_max, the processes of steps subsequent to step S303 to be described later may not be performed.

When the first reference voltage value Vb_tag1 reaches the upper-limit voltage value Vlim_max, the first dead-band value ΔVdb1 can be set to the maximum value ΔVdb1_max. The voltage values Vb of the battery cells 12 included in the battery group 11 may be greater than the upper-limit voltage value Vlim_max. In this case, the first reference voltage value Vb_tag1 is set to the upper-limit voltage value. Vlim_max. Here, the upper-limit voltage value Vlim_max is set so that the battery cell 12 is not overcharged even when the voltage value Vb of the battery cell 12 is greater than the upper-limit voltage value Vlim_max.

In step S303, the controller 40 determines whether the voltage difference ΔV between the voltage value Vb of each battery cell 12 and the first reference voltage value Vb_tag1 is greater than the first dead-band value ΔVdb1 specified through the process of step S302. When the voltage difference ΔV is greater than the first dead-band value ΔVdb1, the controller 40 specifies the battery cell 12 as a cell to be discharged in step S304. Here, the battery cell 12 to be discharged is a battery cell 12 in which the voltage difference ΔV is greater than the first dead-band value ΔVdb1. On the other hand, when the voltage difference ΔV is equal to or less than the first dead-band value ΔVdb1, the controller 40 does not determine the battery cell 12 as a cell to be discharged and performs the process of step S305.

The controller 40 sets a discharging performance flag for the battery cell 12 specified as a cell to be discharged. Here, when identification information (number or the like) is provided to all the battery cells 12 constituting the battery pack 10, the controller 40 can store the identification information and the discharging performance flag in the memory 41 in correlation with each other. Accordingly, the controller 40 can understand the battery cell 12 to be discharged by, checking the identification information and the discharging performance flag.

In step S305, the controller 40 determines whether the discharging determination is completed for all the battery cells 12 in each battery group 11. When a battery cell 12 not subjected to the discharging determination remains, the controller 40 performs the process of step S303 on the battery cell 12.

When the discharging determination is completed for all the battery cells 12 of each battery group 11, the controller 40 excludes the battery group 11 including the battery cell 12 specified as a cell to be discharged from the discharging determination of the second step in step S306. The battery group 11 excluded from the discharging determination of the second step includes one or more battery cells 12 to be discharged. Here, the battery group 11 in which all the battery cells 12 are not specified as a cell to be discharged is subjected to the discharging determination of the second step.

In the process of step S103 illustrated in FIG. 4, the controller 40 discharges the battery cell 12 for which the discharging performance flag is set through the process illustrated in FIG. 6. Accordingly, the voltage value Vb of the battery cell 12 specified as a cell to be discharged can be lowered and the voltage difference ΔV between the voltage value Vb and the first reference voltage value Vb_tag1 can be set to be equal to or less than the first dead-band value ΔVdb1. At the time of performing the process illustrated in FIG. 4, the voltage difference ΔV may not be equal to or less than the first dead-band value ΔVdb1 depending on the discharging quantity of the battery cell 12 during the predetermined time t_th2. Here, by repeatedly performing the process illustrated in FIG. 4, the voltage difference ΔV can be set to be equal to or less than the first dead-band value ΔVdb1.

Figure 8:
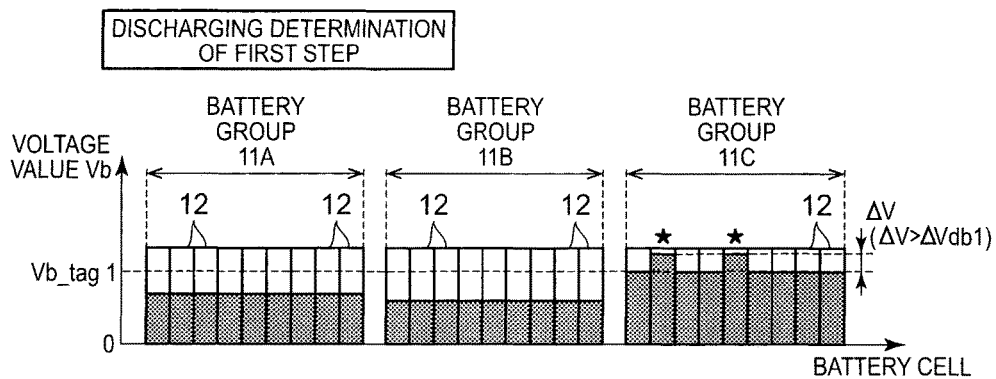
FIG. 8 is a diagram illustrating the discharging determination of the first step when a battery cell to be discharged is specified.

FIG. 8 illustrates the voltage values Vb (an example) of the battery cells 12 in the battery groups 11A to 11C. In FIG. 8, the vertical axis represents the voltage value Vb and the horizontal axis represents the battery cells 12.

In the example illustrated in FIG. 8, the battery cells 12 indicated by a star in the battery group 11C is specified as a cell to be discharged. Here, the voltage difference ΔV between the voltage value Vb of the battery cell 12 specified as a cell to be discharged and the first reference voltage value Vb_tag1 is greater than the first dead-band value ΔVdb1 specified from the first reference voltage value Vb_tag1. Since the battery group 11C includes the battery cell 12 specified as a cell to be discharged, the battery group 11C is excluded from the discharging determination of the second step. In the battery groups 11A, 11B, any of the battery cells 12 is not specified as a cell to be discharged through the discharging determination of the first step. Accordingly, the battery groups 11A, 11B are subjected to the discharging determination f the second step.

According to the discharging determination of the first step, as described with reference to FIG. 7, the less the first reference voltage value Vb_tag1 becomes, the smaller the first dead-band value ΔVdb1 becomes and the more the battery cell 12 is likely to be specified as a cell to be discharged. Accordingly, the less the first reference voltage value Vb_tag1 becomes, the more the voltage values Vb of the battery cells 12 are likely to be aligned in each battery group 11. Here, when the first dead-band value ΔVdb1 is the minimum value ΔVdb1_min, the unevenness, in the voltage values Vb of the battery cells 12 is most suppressed.

On the other hand, according to the setting of the first dead-band value ΔVdb1 illustrated in FIG. 7, the greater the first reference voltage value Vb_tag1 becomes, the greater the first dead-band value ΔVdb1 becomes and the more the battery cell 12 is less likely to be specified. Accordingly, the greater the first reference voltage value Vb_tag1 becomes, the more the unevenness in the voltage values Vb of the battery cells 12 in each battery group 11 is likely to be maintained. Here, when the first dead-band value ΔVdb1 is the maximum value ΔVdb1_max, the unevenness in the voltage values Vb of the battery cells 12 are generated and maintained.

Figure 20:
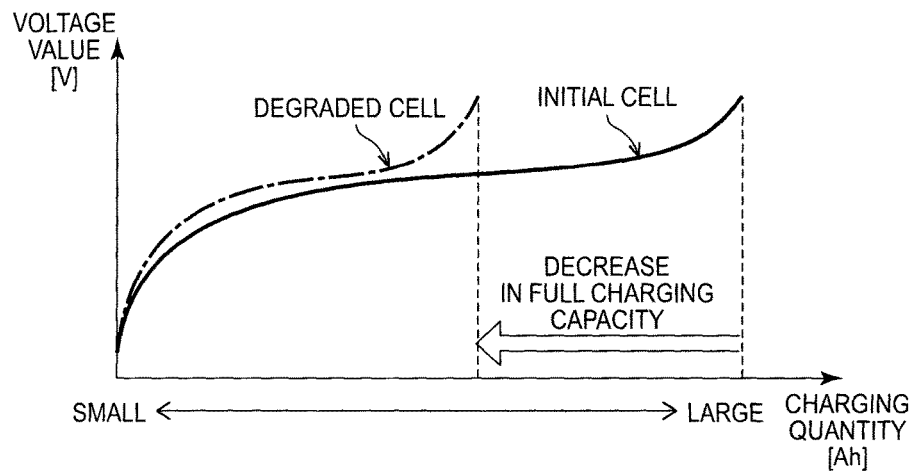
FIG. 20 is a diagram illustrating voltage curves in a degraded cell and an initial cell.
Figure 21:
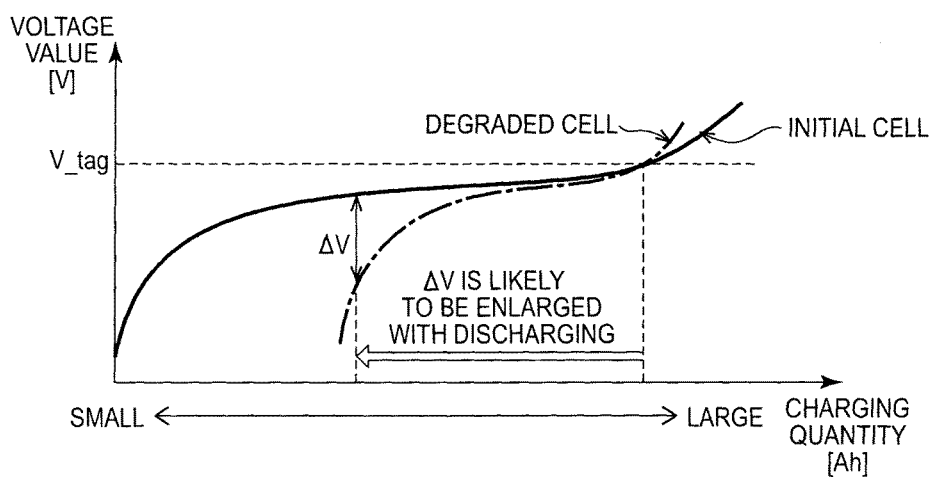
FIG. 21 is a diagram illustrating a state in which a voltage difference between the degraded cell and the initial cell is enlarged.

A battery group 11 may include plural battery cells 12 having different full charging capacities depending on the degradation unevenness of the battery cells 12. The voltage curves of the battery cells 12 have the relationship illustrated in FIG. 20. Here, according to the discharging determination of the first step, as the first reference voltage value Vb_tag1 becomes closer to the lower-limit voltage value Vlim_min, the voltage value Vb of the battery cell 12 in the degraded state and the voltage value Vb of the battery cell 12 in the initial state are more likely to be aligned.

Figure 9:
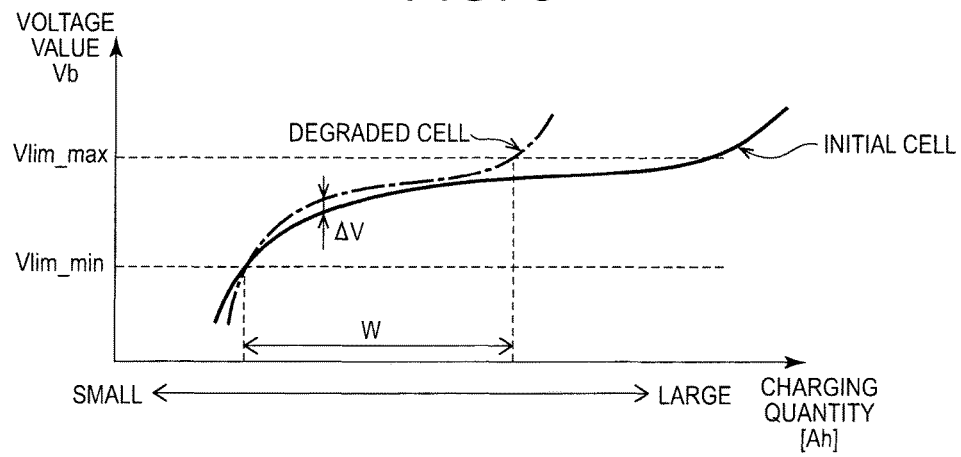
FIG. 9 is a diagram illustrating voltage curves in a degraded cell and an initial cell.

Therefore, the voltage curve of the battery cell 12 in the degraded state and the voltage curve of the battery cell 12 in the initial state have the relationship illustrated in FIG. 9. In FIG. 9, the vertical axis represents the voltage value Vb and the horizontal axis represents the charging quantity. In FIG. 9, the solid line indicates the voltage curve of the battery cell (initial cell) 12 in the initial state and the one-dot chain line indicates the voltage curve of the battery cell (degraded cell) 12 in the degraded state.

A range (referred to as a range of use) W of the charging quantity with which the battery cell 12 can be charged and discharged is defined by the lower-limit voltage value Vlim_min and the upper-limit voltage value Vlim_max. In the battery cells (including the initial cell or the degraded cell) 12 according to this embodiment, within the range of use W, the slope of the voltage curve at the lower-limit voltage value Vlim_min is greater than the slope of the voltage curve at any other voltage value. Here, the slope of the voltage curve is a slope at a tangent line of the voltage curve. The slope of the voltage curve at the lower-limit voltage value Vlim_min is a slope of a tangent line when a point corresponding to the lower-limit voltage value Vlim_min in the voltage curve is a tangent point. The any other voltage value is a voltage value between the lower-limit voltage value Vlim_min and the upper-limit voltage value Vlim_max and is a voltage value other than the lower-limit voltage value Vlim_min.

In the battery cells 12 indicating the above-mentioned voltage curve, the voltage curve of the battery cell 12 in the degraded state and the voltage curve of the battery cell 12 in the initial state can be brought close to each other by setting the voltage curves of the battery cell 12 in the initial state and the degraded state to the state illustrated in FIG. 9. Within the range of use W, as illustrated in FIG. 9, the difference ΔV between the voltage values Vb of the battery cell 12 in the degraded state and the initial state is less likely to be enlarged. That is, it is possible to suppress the enlargement of the voltage difference ΔV in the entire range of use W.

The voltage curves of the plural battery cells 12 having the same full charging capacity are equal to each other. Accordingly, when the voltage difference ΔV is enlarged, the battery cell 12 having a greater voltage value Vb may be discharged. Specifically, in FIG. 7, the first dead-band value ΔVdb1 can be set to the minimum value ΔVdb1_min regardless of the first reference voltage value Vb_tag1.

When the enlargement of the voltage difference ΔV is suppressed in the entire range of use W, it is possible to continuously suppress the enlargement of the voltage difference ΔV in spite of charging and discharging of the battery cell 12 within the range of use W. Accordingly; it is not necessary, to discharge the battery cell 12 to suppress the enlargement of the voltage difference ΔV and it is possible to reduce the number of times of discharging the battery cell 12.

At the time of discharging the battery cell 12, a discharging current of the battery cell 12 merely flows in the resistive elements R11, R21, and R22 as described above. That is, the battery cell 12 is merely uselessly discharged. Here, when the number of times of discharging the battery cell 12 decreases, it is possible to suppress useless discharging of the battery cell 12.

At the time of discharging the battery cell 12, the switch SW1 illustrated in FIG. 3 has to be switched between the ON state and the OFF state. When the number of times of discharging the battery cell 12 increases, the number of times of switching the switch SW1 between the ON state and the OFF state also increases. As in this embodiment, by reducing the number of times of discharging the battery cell 12, it is possible to reduce the number of times of switching the switch SW1 between the ON state and the OFF state. Accordingly, it is possible to suppress the abrasion of the switch SW1.

On the other hand, by suppressing the enlargement of the voltage difference ΔV within the entire range of use W, it can be determined whether an abnormal state to be described below occurs in the respective battery groups 11 for the entire range of use W. Examples of the abnormal state include a minute short circuit in the battery cell 12 and a breakdown of the zener diode D illustrated in FIG. 3.

When a minute short circuit is generated between the positive electrode and the negative electrode in a battery cell 12, the battery cell 12 is continuously discharged. Here, when the unevenness in the voltage values Vb of the plural battery cells 12 is suppressed, it is easy to understand the decrease of the voltage value Vb (voltage variation) due to the minute short circuit. That is, when a minute short circuit is generated in a specific battery cell 12, only the voltage value Vb of the specific battery cell 12 becomes lower than the aligned voltage Vb of the other battery cells 12 and thus it is easy to determine that an abnormal state such as a minute short circuit occurs.

Figure 10:
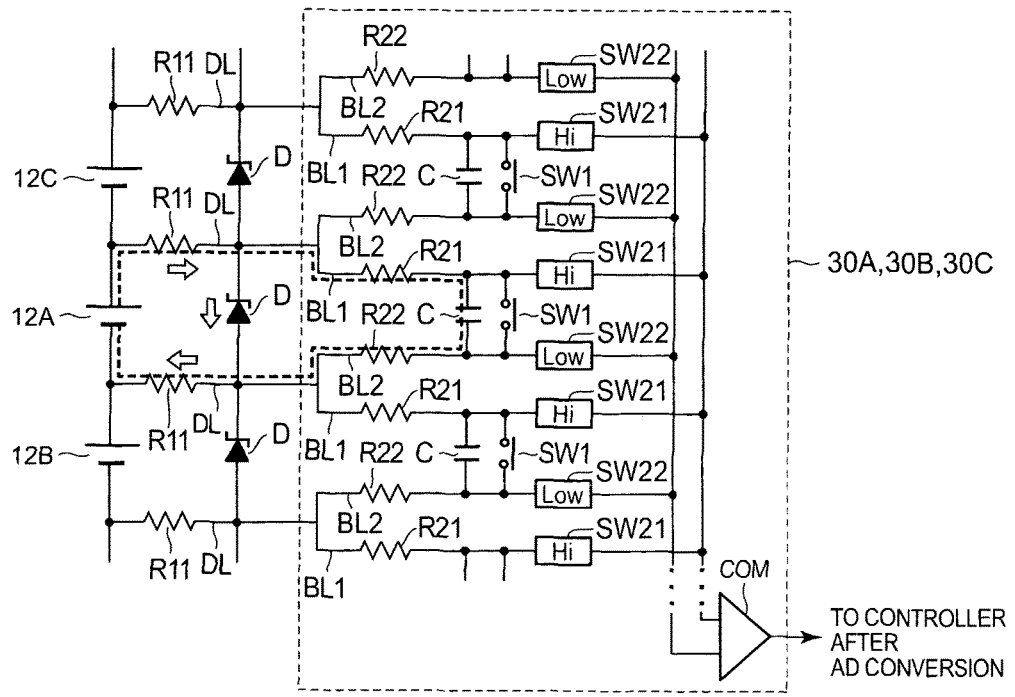
FIG. 10 is a diagram illustrating a state where a leakage current flows in a zener diode.

On the other hand, in the circuit configuration illustrated in FIG. 3, when the zener diode D is broken down, a leakage current may flow in the zener diode D as indicated by an arrow in FIG. 10. At this time, the voltage value Vc of the capacitor C located in a current path indicated by a bold dotted line in FIG. 10 is lower than the voltage value Vb of the battery cell 12A. When a leakage current does not flow in the zener diode D, the voltage value Vc is equal to the voltage value Vb.

The voltage value Vc output from the comparator COM is expressed by Expression (1).

$$Vc = Vb - 2 \times I\_leak \times R \qquad (1)$$

In Expression (1), I_leak represents the value of a leakage current flowing in the zener diode D. R represents the resistance value of the resistive element R11. "I_leak×R" represents an amount of voltage drop due to the leakage current flowing in the resistive element R11. Here, the path in which the leakage current flows and which is indicated by an arrow in FIG. 10 is provided with two resistive elements R11 and thus the amount of voltage drop doubles "I_leak×R".

As can be seen from Expression (1), the voltage value Vc is lower than the actual voltage value Vb of the battery cell 12A. Accordingly, when the charging and discharging of the battery cell 12 (battery pack 10) is controlled on the basis of the voltage value Vc, the actual voltage value Vb of the battery cell 12A may be greater than the upper-limit voltage value Vlim_max and the battery cell 12A may be over charged.

As illustrated in FIG. 10, when a leakage current flows in the zener diode D corresponding to the battery cell 12A, the voltage values Vc of the capacitors C corresponding to the battery cells 12B, 12C rise by "I_leak×R". Accordingly, when the relationship between the voltage drop (voltage variation) of "2×I_leak×R" and the voltage rise (voltage variation) of "I_leak×R" can be specified, it is possible to determine whether the zener diode D is broken down. The battery cells 12B, 12C are battery cells 12 connected in series to the battery cell 12A. In other words, the positive electrode terminal of the battery cell 12B is connected to the negative electrode terminal of the battery cell 12A and the negative electrode terminal of the battery cell 12C is connected to the positive electrode terminal of the battery cell 12A.

Figure 11:
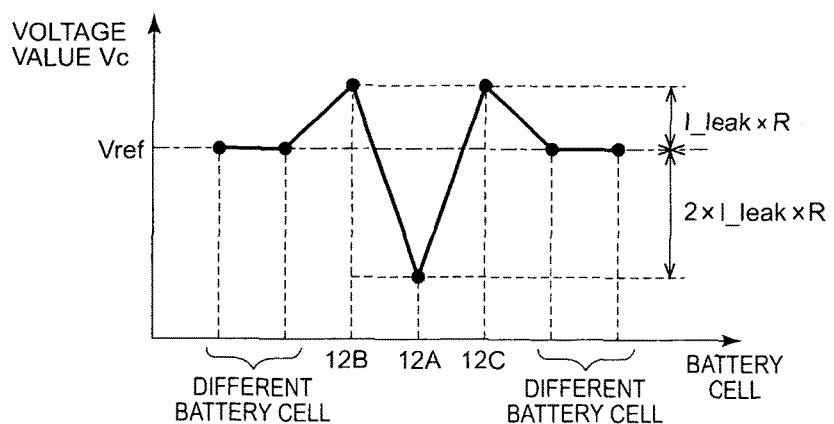
FIG. 11 is a diagram illustrating a relationship between voltage values of battery cells when a leakage current flows in a zener diode.

As described above, in order to determine whether the zener diode D is broken down, it is necessary to suppress the unevenness in the voltage values Vb of the plural battery cells 12 in advance. Here, when the voltage values Vb of the plural battery cells 12 are aligned, the voltage values Vc detected by the monitoring unit 30 when the zener diode D is broken down later exhibit the relationship illustrated in FIG. 11. In FIG. 11, the vertical axis represents the voltage value Vc and the horizontal axis represents the battery cells 12. The voltage value Vref illustrated in FIG. 11 is a voltage value when the voltage values Vb of the plural battery cells 12 are aligned. Here, even when the voltage values Vb of the plural battery cells 12 are aligned, unevenness, may occur in the voltage values Vb. In this case, the voltage values Vb of the plural battery cells 12 are included in a predetermined range including the voltage value Vref.

As illustrated in FIG. 11, the voltage value Vc of the battery cell 12A corresponding to the broken-down zener diode D is less by "2×I_leak×R" than the voltage value Vref. The voltage values Vc of the battery cells 12B, 12C are greater by "I_leak×R" than the voltage value Vref. Accordingly, when the voltage difference between the voltage value Vc of the battery cell 12A and the voltage value Vref and the voltage difference between the voltage value Vc of at least one of the battery cells 12B, 12C and the voltage value Vref have the relationship illustrated in FIG. 11, it can be determined that the zener diode D corresponding to the battery cell 12A is broken down.

Here, even without checking the voltage difference from the voltage value Vref, it is possible to determine the breakdown of the zener diode D. Specifically, it may be checked only whether the voltage value Vc of the battery cell 12A is less than the voltage value Vref and whether the voltage value Vc of at least one of the battery cells 12B, 12C is greater than the voltage value Vref. Alternatively, it may be checked only whether the voltage value Vc of the battery cell 12A is less than the lower limit value of a predetermined range including the voltage value Vref and whether the voltage value Vc of at least one of the battery cells 12B, 12C is greater than the upper limit value of the predetermined range including the voltage value Vref. In this case, it is also possible to determine that the zener diode D corresponding to the battery cell 12A is broken down. As described above, by checking the voltage difference from the voltage value Vref, it is possible to accurately determine the breakdown of the zener diode D.

When the unevenness in the voltage values Vb (voltage value Vc) of the plural battery cells 12 is not suppressed, it is not possible to understand the relationship of the voltage values Vc illustrated in FIG. 11 and it is also not possible to determine the breakdown of the zener diode D. Accordingly, in order to determine the breakdown of the zener diode D, it is necessary to suppress the unevenness in the voltage values Vb (voltage values Vc) of the plural battery cells 12 as described above.

Figure 12:
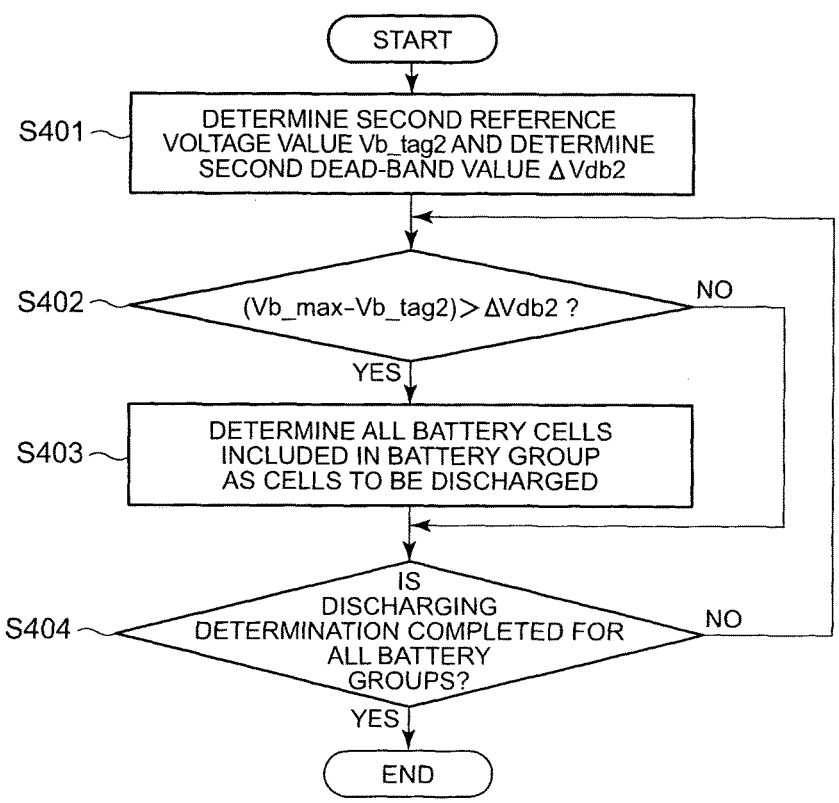
FIG. 12 is a flowchart illustrating a discharging determination process of a second step.

Details of the process of step S202 (discharging determination of the second step) illustrated in FIG. 5 will be described below with reference to the flowchart illustrated in FIG. 12. The process illustrated in FIG. 12 is performed by the controller 40. When the number of battery groups 11 to be subjected to the discharging determination of the second step is two or more, the process illustrated in FIG. 12 is performed. That is, when the number of battery groups 11 to be subjected to the discharging determination of the second step is only one, the process illustrated in FIG. 12 is not performed.

In step S401, the controller 40 specifies a second reference voltage value Vb_tag2 and a second dead-band value (corresponding to the second threshold value in the claims) $\Delta Vdb2$. The second reference voltage value Vb_tag2 used for the discharging determination of the second step is the smallest voltage value Vb out of the voltage values Vb of all the battery cells 12 included in the plural battery groups 11. Here, the voltage values Vb detected through the process of step S301 illustrated in FIG. 6 can be used as the voltage values Vb of the battery cells 12. The second dead-band value $\Delta Vdb2$ is a value (positive value) for determining whether to discharge the battery cells 12 in the discharging determination of the second step.

Figure 13:
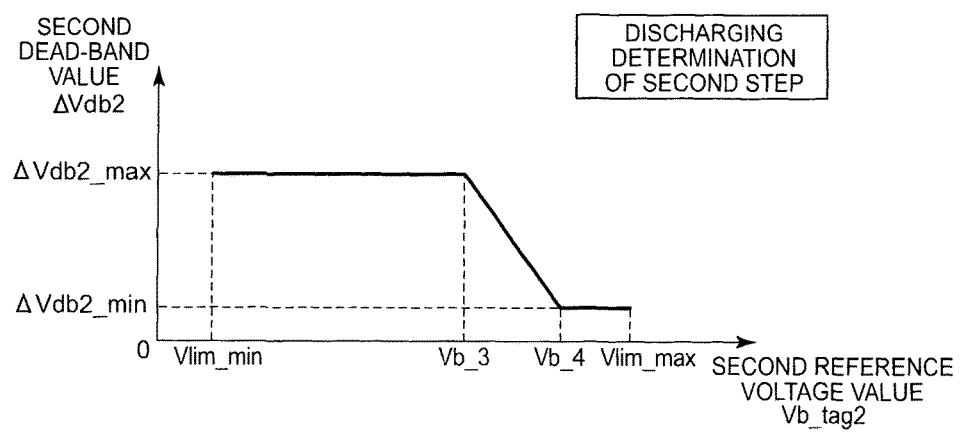
FIG. 13 is a diagram illustrating a relationship between a second dead-band value and a second reference voltage value.

The second dead-band value $\Delta Vdb2$ is different from the first dead-band value $\Delta Vdb1$. In the discharging determination of the second step, the second reference voltage value Vb_tag2 and the second dead-band value $\Delta Vdb2$ have a relationship (an example) illustrated in FIG. 13. The relationship illustrated in FIG. 13 is specified in advance and information (a map or an operational expression) indicating the relationship is stored in the memory 41. As illustrated in FIG. 13, the second dead-band value $\Delta Vdb2$ varies with the variation of the second reference voltage value Vb_tag2. When the relationship illustrated in FIG. 13 is used, it is possible to determine the second dead-band value $\Delta Vdb2$ corresponding to the second reference voltage value Vb_tag2 by determining the second reference voltage value Vb_tag2.

In FIG. 13, when the second reference voltage value Vb_tag2 is the lower-limit voltage value Vlim_min, the second dead-band value $\Delta Vdb2$ is set to a maximum value $\Delta Vdb2\_max$. The maximum value $\Delta Vdb2\_max$ may be equal to or different from the maximum value $\Delta Vdb1\_max$. In a range in which the second reference voltage value Vb_tag2 is less than the lower-limit voltage value Vlim_min, the second dead-band value $\Delta Vdb2$ is not set. In the range in which the second reference voltage value Vb_tag2 is less than the lower-limit voltage value Vlim_min, the processes of steps subsequent to step S402 to be described later may not be performed.

In the example illustrated in FIG. 13, when the second reference voltage value Vb_tag2 is present between the lower-limit voltage value Vlim_min and a third predetermined value Vb_3, the second dead-band value $\Delta Vdb2$ is set to the maximum value $\Delta Vdb2\_max$. The third predetermined value Vb_3 is a voltage value greater than the lower-limit voltage value Vlim_min and can be appropriately set. As the second reference voltage value Vb_tag2 becomes greater than the third predetermined value Vb_3, the second dead-band value $\Delta Vdb2$ becomes less than the maximum value $\Delta Vdb2\_max$.

When the second reference voltage value Vb_tag2 reaches a fourth predetermined value Vb_4, the second dead-band value $\Delta Vdb2$ is set to a minimum value $\Delta Vdb2\_min$. The minimum value $\Delta Vdb2\_min$ may be equal to or different from the minimum value $\Delta Vdb1\_min$. The fourth predetermined value Vb_4 is a voltage value, greater than the third predetermined value Vb_3 and can be appropriately set. When the second reference voltage value Vb_tag2 is present between the fourth predetermined value Vb_4 and the upper-limit voltage value Vlim_max, the second dead-band value $\Delta Vdb2$ is set to the minimum value $\Delta Vdb2\_min$. The fourth predetermined value Vb_4 is a voltage value less than the upper-limit voltage value Vlim_max. When the second reference voltage value Vb_tag2 reaches the upper-limit voltage value Vlim_max, the second dead-band value $\Delta Vdb2$ may be set to the minimum value $\Delta Vdb2\_min$.

In step S402, the controller 40 specifies the highest voltage value Vb_max out of the voltage values Vb of all the battery cells 12 included in the respective battery groups 11. The specification of the voltage value Vb_max is performed for each battery group 11. Here, the voltage value Vb_max is not specified for the battery group 11 including the battery cell 12 indicating the second reference voltage value Vb_tag2.

The controller 40 calculates the voltage difference $\Delta V$ between the voltage value Vb_max and the second reference voltage value Vb_tag2 specified through the process of step S401. That is, the voltage difference $\Delta V$ between the battery group 11 including the battery cell 12 indicating the second reference voltage value Vb_tag2 and another battery group 11 is calculated. Another voltage value Vb other than the voltage value Vb_max may be used to calculate the voltage difference $\Delta V$. That is, the voltage difference $\Delta V$ between two battery groups 11 only has to be calculated as described above.

The controller 40 determines whether the voltage difference $\Delta V$ is greater than the second dead-band value $\Delta Vdb2$ specified through the process of step S401. When the voltage difference $\Delta V$ is greater than the second dead-band value $\Delta Vdb2$, the controller 40 specifies the battery cell 12 as a cell to be discharged in step S403. Here, when the battery cell 12 indicating the voltage value Vb_max is included in a specific battery group 11, all the battery cells 12 included in the specific battery group 11 are specified as cells to be discharged. On the other hand, when the voltage difference ΔV is equal to or less than the second dead-band value ΔVdb2, the controller 40 does not determine the battery cell 12 as a cell to be discharged but performs the process of step S404. The controller 40 sets the discharging performance flag for the battery cell 12 specified as a cell to be discharged, similarly to the discharging determination of the first step.

In step S404, the controller 40 determines whether the discharging determination is completed for all the battery groups 11 to be subjected to the discharging determination of the second step. When a battery group 11 not subjected to the discharging determination remains, the controller 40 performs the process of step S402 on the battery group 11.

In the process of step S103 illustrated in FIG. 4, the controller 40 discharges the battery cell 12 for which the discharging performance flag is set through the process illustrated in FIG. 12. Accordingly, it is possible to decrease the voltage value Vb of, the battery cell 12 specified as a cell to be discharged and thus to bring the voltage difference ΔV between the voltage value Vb and the second reference voltage value Vb_tag2 equal to or less than the second dead-band value ΔVdb2. At the time of performing the process illustrated in FIG. 4, the voltage difference ΔV may not be equal to or less than the second dead-band value ΔVdb2 depending on the discharging quantity of the battery cell 12 during a predetermined time t_th2. Here, the voltage difference ΔV can be made to be equal to or less than the second dead-band value ΔVdb2 by repeatedly performing the process illustrated in FIG. 4.

Figure 14:
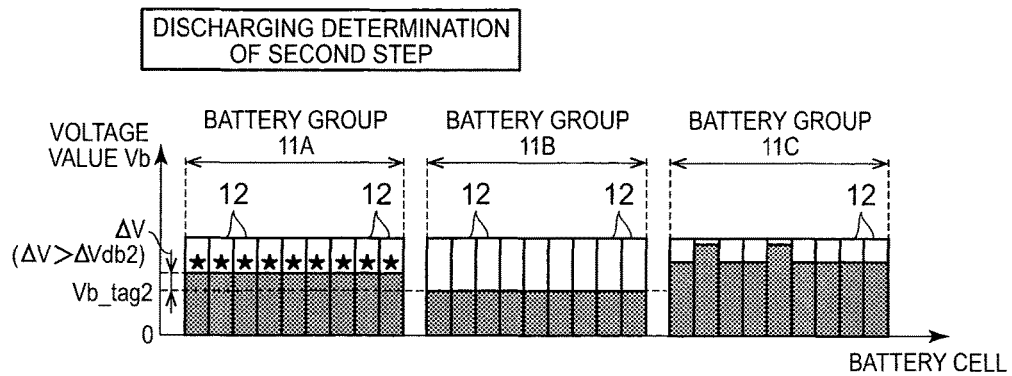
FIG. 14 is a diagram illustrating the discharging determination of the second step when a battery cell to be discharged is specified.

FIG. 14 illustrates the voltage values Vb (an example) of the battery cells 12 in the battery groups 11A to 11C. In FIG. 14, the vertical axis represents the voltage value Vb and the horizontal axis represents the battery cells 12.

In the example illustrated in FIG. 14, the voltage values Vb of the battery cells 12 included in the battery group 11B are set to the second reference voltage value Vb_tag2. All the battery cells 12 included in the battery group 11A are specified as cells to be discharged. The stars in FIG. 14 indicate the battery cells 12 specified as cells to be discharged in the discharging determination of the second step. The voltage differences ΔV between the voltage value Vb of the battery cells 12 specified as cells to be discharged and the second reference voltage value Vb_tag2 are greater than the second dead-band value. ΔVdb2 specified from the second reference voltage value Vb_tag2.

According to the discharging determination of the second step, as described with reference to FIG. 13, the greater the second reference voltage value Vb_tag2 becomes, the less the second dead-band value ΔVdb2 becomes and the more the battery cell 12 is likely to be specified as a cell to be discharged. Accordingly, the greater the second reference voltage value Vb_tag2 becomes, the more easily the voltage values Vb of the battery cells 12 in the plural battery groups 11 are aligned. Here, when the second dead-band value ΔVdb2 is the minimum value ΔVdb2_min, the unevenness in the voltage values Vb of the battery cells 12 in the plural battery groups 11 is most suppressed.

On the other hand, according to the setting of the second dead-band value ΔVdb2 illustrated in FIG. 13, the less the second reference voltage value Vb_tag2 becomes, the greater the second dead-band value ΔVdb2 becomes and the more the battery cell 12 is less likely to be specified as a cell to be discharged. Accordingly, the less the second reference voltage value Vb_tag2 becomes, the more easily the unevenness in the voltage values Vb of the battery cells 12 in the plural battery groups 11 are maintained. Here, when the second dead-band value ΔVdb2 is the maximum value ΔVdb2_max, the unevenness in the voltage values Vb of the battery cells 12 in the plural battery groups 11 is maintained.

The plural battery groups 11 may include the battery cell 12 having different full charging capacities depending on the degradation unevenness of the battery cells 12. When a battery group 11 is interchanged, the full charging capacities of the battery cells 12 included in a non-interchanged battery group 11 may be different from the full charging capacities of the battery cells 12 included in the interchanged battery group 11. The voltage curves of two battery cells 12 having different full charging capacities have the relationship illustrated in FIG. 20.

Here, according to the discharging determination of the second step, as the second reference voltage value Vb_tag2 gets closer to the upper-limit voltage value Vlim_max, the voltage value Vb of the battery cell 12 in the degraded state and the voltage value Vb of the battery cell 12 in the initial state are more easily aligned with each other. Accordingly, the voltage curve of the battery cell 12 in the degraded state and the voltage curve of the battery cell 12 in the initial state have the relationship illustrated in FIG. 15.

Figure 15:
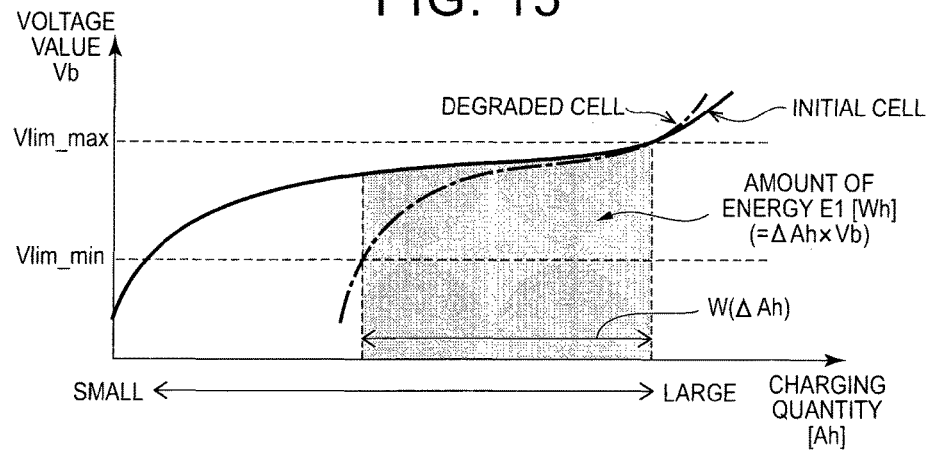
FIG. 15 is a diagram illustrating an amount of energy.

In FIG. 15, the vertical axis represents the voltage value Vb and the horizontal axis represents the charging quantity. In FIG. 15, the solid line indicates the voltage curve of, a battery cell (initial cell) 12 in the initial state and the one-dot chain line indicates the voltage curve of a battery cell (degraded cell) 12 in the degraded state. The battery cell 12 in the initial state and the battery cell 12 in the degraded state are included in different battery groups 11, respectively. In FIG. 15, the voltage value Vb of the battery cell 12 in the initial state and the degraded state is set to the upper-limit voltage value Vlim_max.

In the state illustrated in FIG. 15, it is easy to secure the amount of energy (amount of power) E1 when the battery pack 10 is discharged. The amount of energy E1 is a value obtained by multiplying the discharging quantity ΔAh corresponding to the range of use W by the voltage value Vb. The amount of energy E1 is an amount of energy until the voltage value Vb of the battery cell 12 in the degraded state decreases from the upper-limit voltage value Vlim_max to the lower-limit voltage value Vlim_min.

Figure 16:
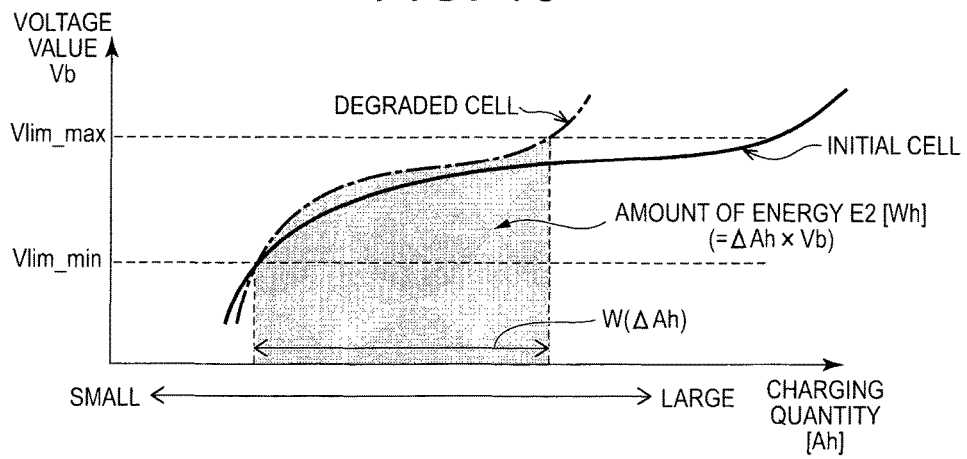
FIG. 16 is a diagram illustrating an amount of energy.

When the voltage curves of the battery cell 12 in the degraded state and the initial state are set to the state illustrated in FIG. 16 on the basis of the discharging determination of the first step, an amount of energy E2 when the battery pack 10 is discharged is less than the amount of energy E1. FIG. 16 corresponds to FIG. 9. Comparing FIGS. 15 and 16, the amounts of energy obtained from the battery cell 12 in the degraded state are equal to each other.

In the state illustrated in FIG. 15, the voltage value Vb of the battery cell 12 in the initial state is greater than the voltage value Vb of the battery cell 12 in the degraded state. On the other hand, in the state illustrated in FIG. 16, the voltage value Vb of the battery cell 12 in the initial state is less than the voltage value Vb of the battery cell 12 in the degraded state. Accordingly, regarding the amount of energy obtained from the battery cell 12 in the initial state, the amount of energy in the state illustrated in FIG. 15 is greater than the amount of energy in the state illustrated in FIG. 16. Accordingly, regarding the amounts of energy E1, E2 including the battery cell 12 in the degraded state and the initial state, the amount of energy E1 is greater than the amount of energy E2.

In this way, according to the discharging determination of the second step, it is easier to secure the amount of energy of the battery pack 10. Accordingly, when the load 20 (the motor-generator set or the like) is supplied with power from the battery pack 10, it is possible to supply the load 20 with a greater amount of power.

On the other hand, the full charging capacity of the battery cell 12 in the degraded state is less than the full charging capacity of the battery cell 12 in the initial state. Accordingly, when the battery cell 12 is charged, the voltage rise of the battery cell 12 in the degraded state becomes greater than the voltage rise of the battery cell 12 in the initial state. Accordingly, when the voltage value Vb of the battery cell 12 gets close to the upper-limit voltage value Vlim_max, the voltage value Vb of the battery cell 12 in the degraded state is likely to be greater than the voltage value Vb of the battery cell 12 in the initial state.

Accordingly, the battery cell 12 in the degraded state is discharged to align the voltage values Vb of the battery cells 12. When the voltage value Vb of the battery cell 12 decreases by a predetermined quantity, the discharging quantity of the battery cell 12 in the degraded state is less than the discharging quantity of the battery cell 12 in the initial state. The less the discharging quantity becomes, the shorter the discharging time becomes. Accordingly, according to the discharging determination of the second step, it is possible to shorten the time until the voltage values Vb of the battery cells 12 are aligned.

Figure 17:
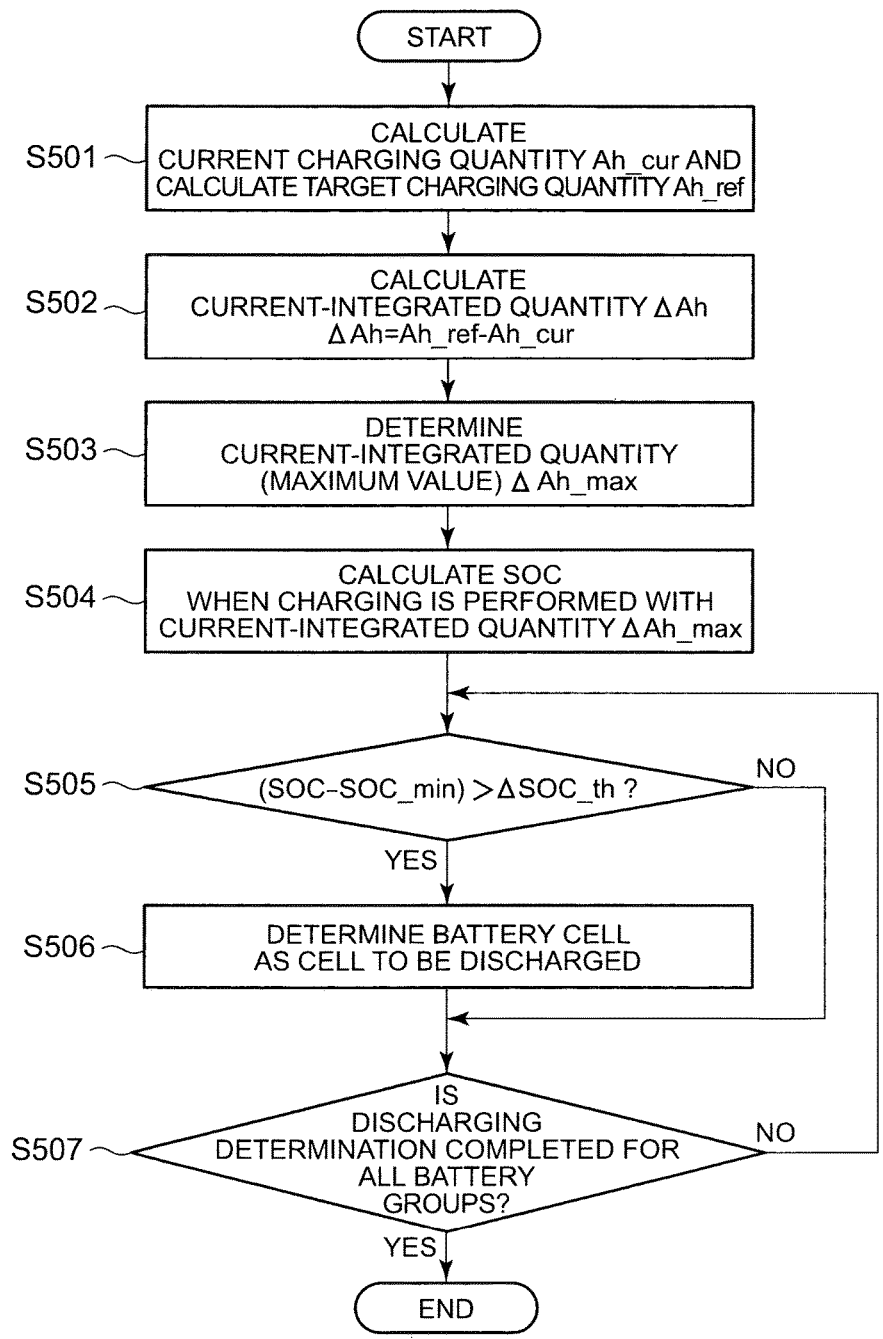
FIG. 17 is a flowchart illustrating a discharging determination process of a third step.

Details of the process of step S203 (the discharging determination of the third step) illustrated in, FIG. 5 will be described below with reference to the flowchart illustrated in FIG. 17. The process illustrated in FIG. 17 is performed by the controller 40. When the number of battery groups 11 to be subjected to the discharging determination of the third step is two or more, the process illustrated in FIG. 17 is performed. Here, when the number of battery groups 11 to be subjected to the discharging determination of the third step is only one, the process illustrated in FIG. 17 is not performed.

In step S501, the controller 40 calculates charging quantities Ah_cur, Ah_ref for each battery group 11. The charging quantity Ah_cur is a current charging quantity of the battery cells 12 included in the battery group 11. The charging quantity Ah_cur can be calculated from a, full charging capacity and a state of charge (SOC) of the current battery cell 12. The SOC is a ratio of the current charging quantity to the full charging capacity.

The charging quantity Ah_cur can be calculated by multiplying the full charging capacity by the current SOC. The full charging capacity and the SOC can be calculated in advance. Known methods can be appropriately employed as the method of calculating the full charging capacity and the SOC, and thus detailed description thereof will not be made. Since each battery group 11 includes plural battery cells 12, the charging quantity Ah_cur can be calculated for each battery cell 12 included in the battery group 11.

The charging quantity Ah_ref is a charging quantity when the SOC of a battery cell 12 is a target SOC greater than the current SOC. Here, the target SOC can be set in consideration of the second reference voltage value Vb_tag2 when the second dead-band value ΔVdb2 is the minimum value ΔVdb2_min in the discharging determination of the second step. For example, as illustrated in FIG. 15, when the voltage value Vb of the battery cell 12 is aligned with the upper-limit voltage value Vlim_max, the SOC corresponding to the upper-limit voltage value Vlim_max can be set as the target SOC. When the target SOC is set, the charging quantity Ah_ref can be calculated by multiplying the full charging capacity of the battery cell 12 by the target SOC.

In this embodiment, one charging quantity Ah_cur as a representative value is calculated for each battery group 11. Specifically, the full charging capacities of all the battery cells 12 included in the battery group 11 are specified and an average value of the full charging capacities is calculated. The SOCs of all the battery cells 12 included in the battery group 11 are specified and an average value of the SOCs is calculated. The charging quantity Ah_cur of each battery group 11 can be calculated on the basis of the full charging capacity (average value) and the SOC (average value).

One charging quantity Ah_ref as a representative value is calculated for each battery group 11. Specifically, the charging quantity Ah_ref can be calculated by multiplying the above-mentioned full charging capacity (average value) by the target SOC. In the processes of steps subsequent to step S502, it is assumed that the charging quantities Ah_cur, Ah_ref as representative values are calculated for each battery group 11. The same process can be performed to calculate the charging quantities Ah_cur, Ah_ref for each battery cell 12.

In step S502, the controller 40 calculates a current-integrated' quantity ΔAh. The current-integrated quantity ΔAh is a value obtained by subtracting the charging quantity Ah_cur from the charging quantity Ah_ref. The current-integrated quantity ΔAh is calculated for each battery group 11. In step S503, the controller 40 specifies the current-integrated quantity ΔAh·max indicating the maximum value on the basis of the current-integrated quantities ΔAh calculated for plural battery groups 11.

In step S504, the controller 40 calculates the SOC of each battery group 11 when the corresponding battery group 11 is charged by the current-integrated quantity ΔAh_max. Specifically, by adding the current-integrated quantity ΔAh_max to the charging quantity Ah_cur of each battery group 11, the charging quantity of each battery group 11 after being charged can be calculated. The SOC of each battery group 11 can be calculated on the basis of the charging quantity and the full charging quantity (average value) of each battery group 11.

In step S505, the controller 40 specifies the minimum SOC (SOC_min) out of the SOCs calculated through the process of step S504. Then, the controller 40 calculates a difference ΔSOC between the minimum SOC SOC_min and the SOC (SOC other than SOC_min) of another battery group 11. The controller 40 determines whether the difference ΔSOC is greater than a threshold value (corresponding to the third threshold value in the claims) ΔSOC_th.

The threshold value ΔSOC_th is set in consideration of the minimum value ΔVdb2_min illustrated in FIG. 13. The threshold value ΔSOC_th can be determined in advance and information for determining the threshold value ΔSOC_th can be stored in the memory 41. When the difference ΔSOC is greater than the threshold value ΔSOC_th, the controller 40 specifies the battery cell 12 as a cell to be discharged in step S506. The battery cell 12 specified as a cell to be discharged is all the battery cells 12 included in the battery group 11. The controller 40 sets the discharging performance flag for the battery cells 12 specified as cells to be discharged, similarly to the discharging determination of the first step.

When the difference ΔSOC is equal to or less than the threshold value ΔSOC_th, the controller 40 does not determine the battery cell 12 as a cell to be discharged but performs the process of step S507. In step S507, the controller 40 determines whether the discharging determination is completed for all the battery groups 11. When a battery group 11 not subjected to the discharging determination remains, the controller 40 performs the process of step S505 on the battery group 11.

In the process of step S103 illustrated in FIG. 4, the controller 40 discharges the battery cell 12 for which the discharging performance flag is set through the process illustrated in FIG. 17. Accordingly, the voltage value Vb of the battery cell 12 specified as a cell to be discharged can be lowered in advance and the charging quantities of the plural battery cells 12 can be aligned with the charging quantity Ah_ref when the battery pack 10 is charged. That is, when the plural battery cells 12 are charged by the current-integrated quantity ΔAh_max, the charging quantities of the plural battery cells 12 reach the charging quantity Ah_ref.

As described above, when the charging quantity Ah_ref is a charging quantity corresponding to the upper-limit voltage value Vlim_max, the voltage values Vb of the plural battery cells 12 can be aligned with the upper-limit voltage value Vref_max. In the discharging determination of the third step, it is easy to secure the amount of energy when the battery pack 10 is discharged, similarly to the discharging determination of the second step.

Figure 18:
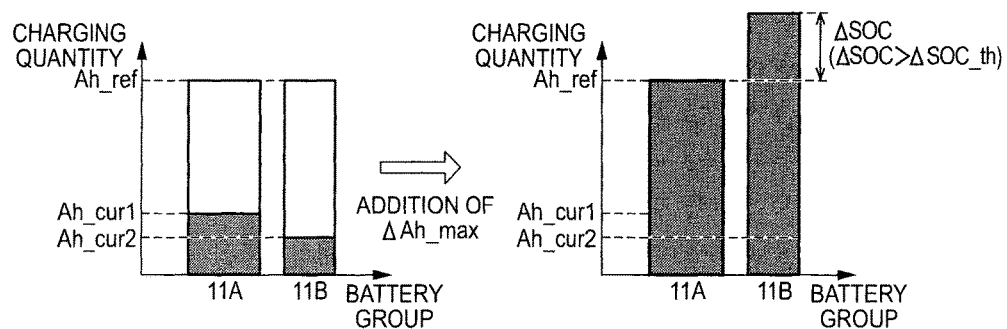
FIG. 18 is a diagram illustrating the discharging determination of the third step.

The left part of FIG. 18 illustrates a relationship between the current charging quantities Ah_cur1, Ah_cur2 of two battery groups 11A, 11B and the charging quantity Ah_ref. The full charging capacity of the battery cells 12 included in the battery group 11A is greater than the full charging capacity of the battery cells. 12 included in the battery group 11B. The current-integrated quantity ΔAh_max is set to a value obtained by subtracting the charging quantity Ah_cur1 from the charging quantity. Ah_ref. When the current-integrated quantities ΔAh_max in the battery group 11A are added, the charging quantity of the battery group 11A is changed from the charging quantity Ah_cur1 to the charging quantity Ah_ref.

On the other hand, when the current-integrated quantities ΔAh_max in the battery group 11B are added, the charging quantity of the battery group 11B may be greater than the charging quantity Ah_ref. here, the difference between the charging quantity of the battery group 11B and the charging quantity Ah_ref corresponds to the difference ΔSOC. As described above, when the difference ΔSOC is greater than the threshold value ΔSOC_th, the battery cells 12 included in the battery group 11B are specified as cells to be discharged.

In the discharging determination of the third step, the battery cells 12 included in the battery group 11B are discharged in the state illustrated in the left part of FIG. 18. That is, according to the discharging determination of the third step, the charging quantity Ah_cur2 of the battery group 11B is less than the charging quantity Ah_cur1 of the battery group 11A, but the battery cells 12 included in the battery group 11B are discharged.

In FIG. 13, when the second reference voltage value Vb_tag2 continuously varies within a range less than the third predetermined value Vb_3, a battery cell 12 to be discharged may not be specified through the discharging determination of the second step. Accordingly, in the discharging determination of the third step, when the second reference voltage value Vb_tag2 is less than the third predetermined value Vb_3 but the battery pack 10 is charged, the same advantages as when the discharging determination of the second step is performed can be obtained.

Figure 2:
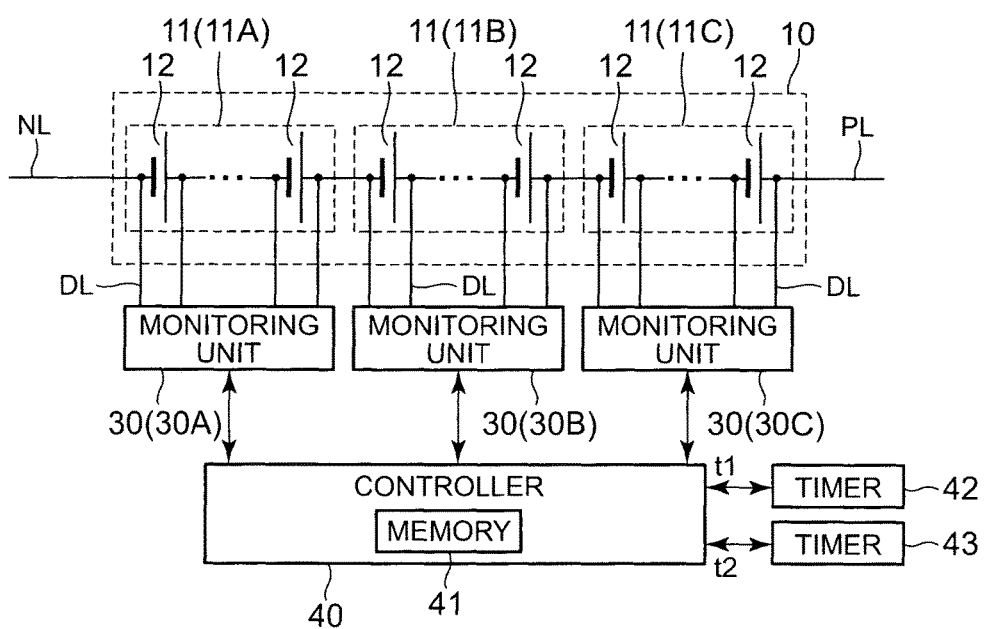
FIG. 2 is a diagram illustrating configurations of a battery pack and a monitoring unit.
Figure 19:
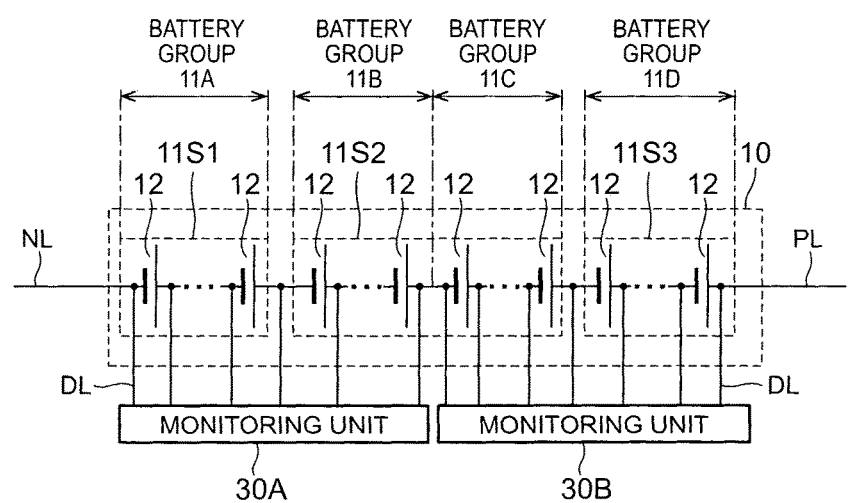
FIG. 19 is a diagram illustrating configurations (modification example) of a battery pack and a monitoring unit.

The invention is not limited to the configuration illustrated in FIG. 2. For example, the invention can be applied to a configuration illustrated in FIG. 19. In FIG. 19, the battery pack 10 includes three batter stacks 11S (11S1, 11S2, and 11S3) connected in series. The battery stacks 11S1 to 11S3 are constituted as single units, respectively, and the respective battery stacks 11S1 to 11S3 can be individually interchanged.

Here, the monitoring unit 30A is connected to the battery cells 12 included in two battery stacks 11S1, 11S2. Specifically, the monitoring unit 30A is connected to all the battery cells 12 included in the battery stack 11S1. The monitoring unit 30A is connected to some battery cells 12 included in the battery stack 11S2. The monitoring unit 30B is connected to the battery cells 12 included in two battery stacks 11S2, 11S3. Specifically, the monitoring unit 30B is connected to all the battery cells 12 included in the battery stack 11S3. The monitoring unit 30B is connected to some battery cells 12 included in the battery stack 11S2.

In this case, as illustrated in FIG. 19, the battery pack 10 can be partitioned into four battery groups (corresponding to the electric storage element groups in the claims 11A to 11D. The discharging determination of the first to third steps can be performed on the battery groups 11A to 11D. here, the battery groups 11A to 11D are grouped on the condition that the cells are included in the same battery stack 11S and are connected to the same monitoring unit 30.

On the other hand, the invention may be applied to a configuration in which plural monitoring units 30 are connected to a single battery stack 11S. In this case, the single battery stack 11S can be partitioned into plural battery groups depending on the plural monitoring units 30. Here, the number of battery groups is equal to the number of monitoring units 30. The invention may be applied to a configuration in which a single monitoring unit 30 is connected to plural battery stacks 11S. In this case, the plural battery groups are partitioned depending on the plural battery stacks 11S. Here, the number of battery groups is equal to the number of battery stacks 11S.

In this embodiment, the monitoring unit 30 detects the voltage value Vb of each battery cell 12, but the invention is not limited to this configuration. For example, when plural battery cells 12 connected in series constitute a single battery module (corresponding to the electric storage element in the claims), the monitoring unit 30 may detect the voltage value of each battery module.

The invention claimed is:

1. An electric storage system, comprising:
a plurality of electric storage elements that are connected in series, a slope, of a voltage curve of the electric storage element at a lower-limit voltage value being greater than a slope of allowed, the voltage curve being a curve indicating a relationship between a charging quantity and a voltage value in the electric storage element;
a voltage detecting circuit configured to detect the voltage values of each of the plurality of electric storage elements;
a discharging circuit configured to discharge each of the plurality of electric storage elements; and
a controller configured to:
(a) control an operation of the discharging circuit on the basis of the voltage values detected by the voltage detecting circuit;
(b) determine a first reference voltage value indicating a lowest voltage value from the voltage values of the plurality of electric storage elements;

(c) discharge the electric storage element indicating the voltage value of which a voltage difference from the first reference voltage value is greater than a first threshold value; and (d) set the first threshold value to a smaller value as the first reference voltage value becomes lower;

(e) determine the first reference voltage value for each of a plurality of electric storage element groups, the electric storage element group including the plurality of electric storage elements connected in series, the plurality of electric storage element groups are connected in series;

(f) determine the electric storage element to be subjected to discharging control using the first reference voltage value and the first threshold value for each of the electric storage element groups;

(g) determine a non-discharge electric storage group including no electric storage element to be subjected to the discharging control;

(h) determine the electric storage element group including the electric storage element indicating a lowest voltage value and the other electric storage element groups on the basis of the voltage values of the electric storage elements included in the non-discharge electric storage groups when two or more non-discharge electric storage element groups are present;

(i) determine a second reference voltage value indicating a lowest voltage value from the voltage values of the electric storage elements included in the non-discharge electric storage groups when two or more non-discharge electric storage element groups are present;

(j) discharge the electric storage elements included in the other electric storage element groups when the voltage differences between the second reference voltage value and the voltage value of the electric storage elements included in the other electric storage element groups are greater than a second threshold value; and (k) set the second threshold value to a smaller value as the second reference voltage value becomes higher.

2. The electric storage system according to claim 1, wherein the controller is further configured to:

(l) set the second threshold value to a largest value when the second reference voltage value is the lower-limit voltage value; and (m) set the second threshold value to a smallest value when the second reference voltage value is the upper-limit voltage value.

3. An electric storage system comprising:
a plurality of electric storage elements that are connected in series, a slope of a voltage curve of the electric storage element at a lower-limit voltage value being greater than a slope of the voltage curve at another voltage value in a range of an upper-limit voltage value and the lower-limit voltage value in which charging and discharging of the electric storage element are allowed, the voltage curve being a curve indicating a relationship between a charging quantity and a voltage value in the electric storage element;
a voltage detecting circuit configured to detect the voltage values of each of the plurality of electric storage elements;
a discharging circuit configured to discharge each of the plurality of electric storage elements; and
a controller configured to:
(a) control an operation of the discharging circuit on the basis of the voltage values detected by the voltage detecting circuit;

(b) determine a first reference voltage value indicating a lowest voltage value from the voltage values of the plurality of electric storage elements;

(c) discharge the electric storage element indicating the voltage value of which a voltage difference from the first reference voltage value is greater than a first threshold value; and (d) set the first threshold value to a smaller value as the first reference voltage value becomes lower;

(n) determine the first reference voltage value for each of a plurality of electric storage element groups including the plurality of electric storage elements connected in series, the plurality of electric storage element groups are connected in series;

(o) determine the electric storage element to be subjected to discharging control using the first reference voltage value and the first threshold value for each electric storage element group;

(p) determine a non-discharge electric storage group including no electric storage element to be subjected to the discharging control;

(q) estimate, when two or more non-discharge electric storage element groups are present, SOCs of the electric storage elements in the non-discharge electric storage element groups after the electric storage elements in the non-discharge electric storage element groups are charged on the basis of full charging capacities and current SOCs of the electric storage elements; and (r) discharge the electric storage element in which a difference between the minimum value of the estimated SOCs of the electric storage elements and the estimated SOCs of the electric storage elements is greater than a third threshold value.

4. An electric storage system comprising:
a plurality of electric storage elements that are connected in series, a slope of a voltage curve of the electric storage element at a lower-limit voltage value being greater than a slope of the voltage curve at another voltage value in a range of an upper-limit voltage value and the lower-limit voltage value in which charging and discharging of the electric storage element are allowed, the voltage curve being a curve indicating a relationship between a charging quantity and a voltage value in the electric storage element;
a voltage detecting circuit configured to detect the voltage values of each of the plurality of electric storage elements;
a discharging circuit configured to discharge each of the plurality of electric storage elements;
a controller configured to:
(a) control an operation of the discharging circuit on the basis of the voltage values detected by the voltage detecting circuit;

(b) determine a first reference voltage value indicating a lowest voltage value from the voltage values of the plurality of electric storage elements;

(c) discharge the electric storage element indicating the voltage value of which a voltage difference from the first reference voltage value is greater than a first threshold value; and (d) set the first threshold value to a smaller value as the first reference voltage value becomes lower; and a zener diode of which a cathode is connected to a positive electrode terminal of each electric storage element and an anode is connected to a negative electrode terminal of each electric storage element via a line connecting the corresponding electric storage element and the voltage detecting circuit, wherein the controller is configured to determine whether a leakage current flows in the zener diode corresponding to one of the electric storage elements, when the voltage value of the one of the electric storage elements becomes lower than a lower limit value of a predetermined range and the voltage value of the electric storage element connected in series to the one of the electric storage elements indicating becomes higher than an upper limit value of the predetermined range, after the voltage values of the plurality of electric storage elements are adjusted to the predetermined range through the discharging control of the electric storage elements based on the first threshold value.

* * * * *